(12) United States Patent
Schabes et al.

(10) Patent No.: US 8,793,324 B1
(45) Date of Patent: Jul. 29, 2014

(54) DISCUSSION-TOPIC, SOCIAL NETWORK SYSTEMS

(71) Applicant: LavaRipples, LLC, Newton, MA (US)

(72) Inventors: Yves Schabes, Newton, MA (US); Emmanuel Roche, Belmont, MA (US)

(73) Assignee: LavaRipples, LLC, Newton, MA (US)

( * ) Notice: Subject to any disclaimer, the term of this patent is extended or adjusted under 35 U.S.C. 154(b) by 0 days.

(21) Appl. No.: 14/153,587

(22) Filed: Jan. 13, 2014

Related U.S. Application Data

(63) Continuation of application No. 14/021,662, filed on Sep. 9, 2013, now Pat. No. 8,676,913.

(51) Int. Cl.
*G06F 15/16* (2006.01)
*H04L 12/58* (2006.01)

(52) U.S. Cl.
CPC .................... *H04L 51/22* (2013.01)
USPC ........................................................ 709/206

(58) Field of Classification Search
CPC ................................ H04L 51/22; H04L 51/32
USPC ........................................................ 709/206
See application file for complete search history.

(56) References Cited

U.S. PATENT DOCUMENTS

| 7,669,123 | B2 | 2/2010 | Zuckerberg et al. |
| 8,060,830 | B2 | 11/2011 | Kahn et al. |
| 2006/0200443 | A1 | 9/2006 | Kahn et al. |
| 2006/0200740 | A1 | 9/2006 | Kahn et al. |
| 2006/0253459 | A1 | 11/2006 | Kahn et al. |
| 2006/0253489 | A1 | 11/2006 | Kahn et al. |
| 2007/0192299 | A1 | 8/2007 | Zuckerberg et al. |

OTHER PUBLICATIONS

[No Author Listed] "View email messages by conversation- Outlook-Office.com". Microsoft Corporation. 2013. Available at http://office.microsoft.com/en-us/outlook-help/view-email-messages-by-conversation-HA010362041.aspx?CTT=1. Last accessed Sep. 9, 2013.

*Primary Examiner* — Jerry Dennison
(74) *Attorney, Agent, or Firm* — Wolf, Greenfield & Sacks, P.C.

(57) ABSTRACT

Apparatus and methods for social media networking using devices configured to communicate in a data communications network where exchanged information is organized according to discussion topics. Users may exchange content with selected members of discussion-topic groups. Initiating comments and replies may be posted to a discussion topic for review by participants. Sub-discussion topics may be defined for discussion topics. A user may further flexibly define active tag and associated arguments for the active tags as a relational or linking structure for a discussion topic. Conventional email messages may be converted and ported into the discussion-topic system.

25 Claims, 17 Drawing Sheets

380 create a new discussion enter discussion name (< 30 characters)  382

Invite  390 enter description of discussion (optional)

384 tags  386

Relation  387

Add Discussion  388

Cancel  389

*FIG. 3B*

| Contacts 303 | Groups 305 | Home 307 | Me 309 | Help 311 | | 312 | | Log Out 313 |

Discussion Page

BMC_litigation@decker    138 comments
created on Mar 28, 2012
Member: May post new comments
Follower: May reply to all comments                410

Description    edit
For general discussions relating to overall
strategy re BMC v. BetterTech Inc.    420

Shared with:
Members: @alex, @bethany, @chandra, @vince
Followers: @kathy    430

Tags
BMC, #activelitigation    440

Smarttags    add
&&matter_costs    450

Subdiscussions
BMC_complaint, BMC_depositions    (all) 460

Superdiscussions
2012_litigation    470

All ∨  361    360  Search 362

412 (R)

| Comment View | Image View | File View |

@alex (BMC_complaint)    Feb 12/9:37    480-1
I've finished my analysis of the product and am ready
to discuss.

@kathy (BMC_depositions)    Feb 10/16:13    480-2
Attached is the draft of the Herman deposition taken
on February 2. Let me know if you would like a hard copy.

@chandra (BMC_depositions)    Feb 8/10:12    480-3
The Herman deposition has two valuable points that
should help our case. I've asked Kathy to transcribe for our next @decker (BMC_depositions)    Feb 7/15:44    480-4
Alex, any chance you can wrap up the product analysis
by the end of next week?

@bethany (BMC_depositions)    Feb 3/09:50    480-5
I met with Dwight Herman yesterday for the
deposition. Attached is a recording, though it is a bit long. I'll    480

490 chandra; alex; kathy

*FIG. 4A*

482
Comment View    Image View    File View
parent topic
sub-topic 1
sub-topic 2
*FIG. 4D*

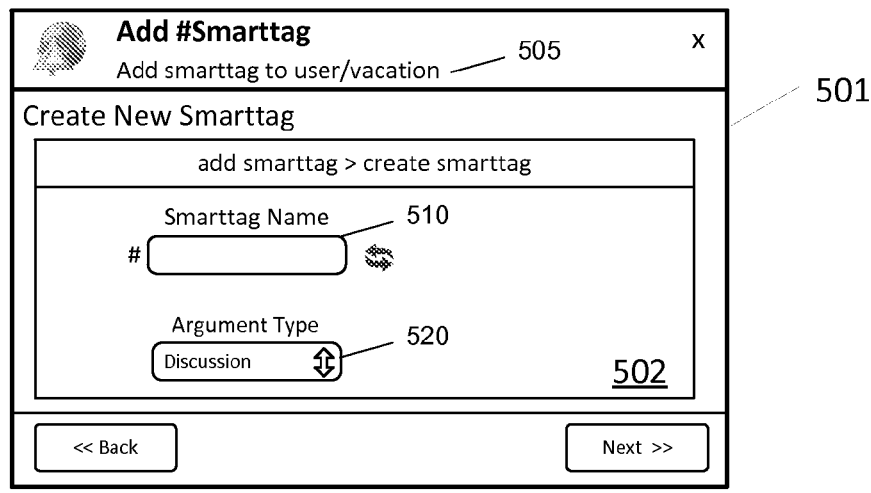
*FIG. 5A*
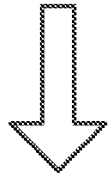
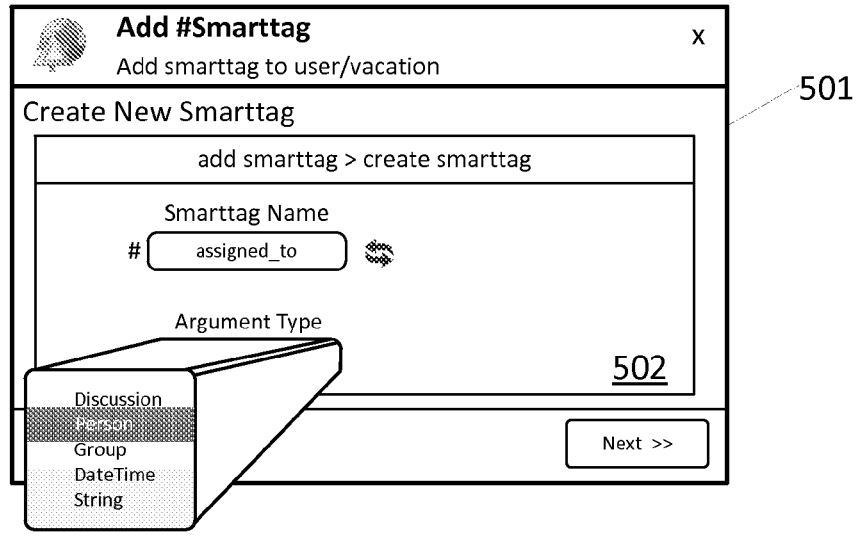
*FIG. 5B*

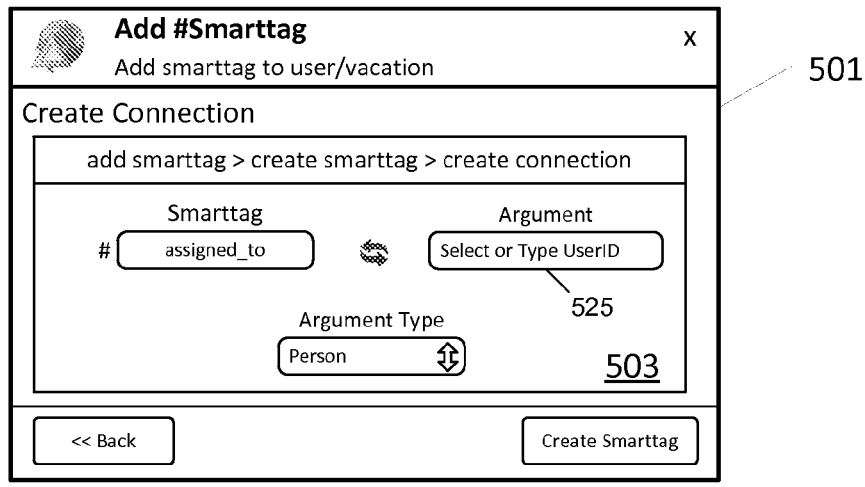
FIG. 5C
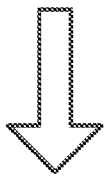
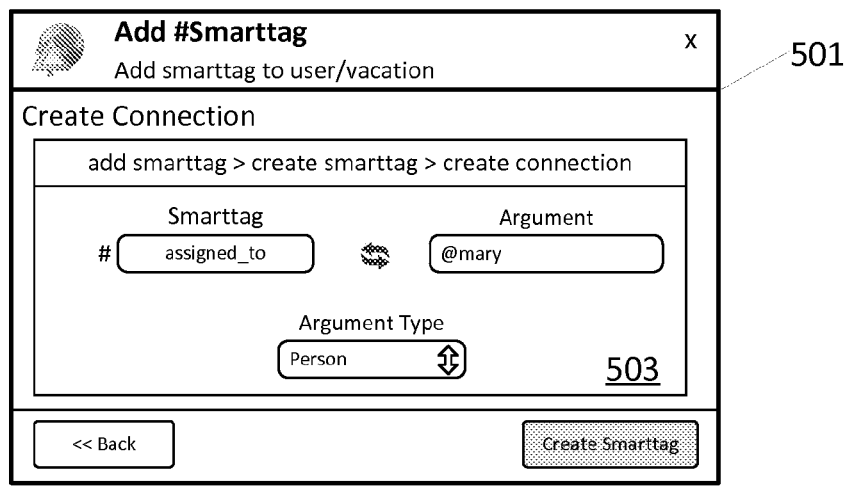
FIG. 5D

FIG. 7A

710 → All ⌄ 361 | &&due_date(< 7/1/2013) 360 | Search 362 all discussions
discussion_id1
discussion_id2
@person1
@person2

FIG. 7B

710 → All ⌄ 361 | &&assigned_to(@mary) 360 | Search 362 all discussions
discussion_id1
discussion_id2
@person1
@person2

| To: entity1; entity2 | 810 |
| From: entity3 | 820 |
| Re: subject1 | 830 |
| CC: entity4; entity5; fred@dt.com | 840 |
| BCC: entity6 | 850 |

Address information    860-1

Dear entity1 and entity2
    Message 3

Address information    860-2

Dear entity3
    Message 2

Address information    860-3

Dear entity1
    Message 1

DISCUSSION-TOPIC, SOCIAL NETWORK SYSTEMS

RELATED APPLICATIONS

This application is a continuation of U.S. Pat. No. 8,676,913, titled "Discussion-Topic, Social Network Systems," filed on Sep. 9, 2013, of which the entire disclosure is incorporated herein by reference.

FIELD

The technology described relates to social media network systems in which interactions between system users may be organized according to discussion topics. The system provides for sharing of content (e.g., digitally-encoded information) associated with discussion topics between a plurality of user-operated, data-processing devices that are adapted to communicate in a data communication network.

BACKGROUND

Since the development of networked computers, there have been various ways in which documents and other informational content can be shared between one or more computers or devices connected to the network. The sharing of content between computers or devices connected to a network allows different users of the computers and devices to share, almost instantaneously over large distances, various types and amounts of useful information. For example, the shared "content" may comprise analog or digital data structures encoding, but not limited to, text, audio, video, graphic, spreadsheet, photo, CAD drawing, and ledger renderings that can be read, processed, and/or provided for graphical display by at least one mechanized processor. The size or amount of content, in terms of digital bits, may be small (e.g., on the order of kilobytes or less) or large (e.g., on the order of megabytes, gigabytes, terabytes, or more). With mobile processing and satellite connectivity to the network, content may be shared virtually instantaneously at most regions of the globe.

One popular system that has been developed for sharing content between users of networked devices is known as Facebook. A user subscribing to Facebook may post content to a data store on the web that is associated with that user. The user may identify "friends" that are granted access to the user's postings and other content uploaded to a social network server. The user may be given permission to access other users' content. In this system, the content is organized around users.

SUMMARY

With increasing use of content-sharing systems, and increasing amounts of content that are shared over networks, organization of the content for review and retrieval becomes an important factor in evaluating the usefulness of a social network system. Described is a system configured for sharing content among user-defined user groups, wherein the shared content is organized around discussion topics. The discussion-topic, social network system provides for agile collaboration, organization, and exchange of large amounts of data in a network environment. According to some embodiments, the system reduces organizational burdens that a conventional email user may experience that are associated with sorting emails into manually-created folders. The discussion-topic, social network system is cross-compatible with conventional email systems, so as to allow conventional email users to readily transition between the two systems.

Discussion topics may be defined by any system user, e.g., via a graphical user interface. According to some embodiments, a system component (e.g., a discussion-topic server or user device) may create a discussion data structure for each discussion topic, and organize user-contributed content that is identified as belonging to a particular discussion topic into corresponding discussion data structures. By accessing the discussion data structures, system components may render the content for any selected discussion topic on a visual display of a user's device such as a smart phone, tablet, or computer. A user of the system may define and initiate any number of discussion topics, and invite other system users to participate in any one discussion topic. Access privileges for the invited participants of each particular discussion topic may be set through a user interface, such as a graphical-user interface, and may classify invited participants into different categories. Additional content, e.g., documents, photos, video, recordings, etc., may be attached to comments posted to a discussion topic.

The system provides for establishing hierarchical relations between discussion topics, e.g., parent topic, sup-topic. In various embodiments, content (e.g., user comments, images, files) associated with a discussion topic may be rendered on a display of a user's device as one or more lists or visual feeds organized according to one or more user-selected discussion topics. Responsive to a user's selection, content for a single discussion topic may be rendered in a full-screen listing. Such lists facilitate a user's review of content pertinent to a particular discussion topic. In some embodiments, the system provides for a user-selection of any combination of discussion topics associated with a parent topic for viewing of related content (e.g., parent topic only, parent topic and one or more sub-topics, one or more sub-topics). In some embodiments, the system may render content associated with a selected discussion topic in a list that differentiates between initiating comments and replies to initiating comments.

The discussion-topic, social network system may be cross-compatible with conventional email systems. For example, the system may convert email chains and import related data into a user's discussion-topic account, and generate a discussion data structure for use and presentation as a discussion topic in accordance with the discussion-topic, social network system protocols. Additionally, the system allows a user to receive, review, and reply to comments posted to a discussion topic using either the functionality of the discussion-topic, social network system or functionality provided by a conventional email service.

In some embodiments, the discussion-topic system can receive data to flexibly define an active tags and associate the active tag with at least one discussion topic and its related discussion data structure. An active tag (which may be referred to as a "smarttag") may include an argument and represent an active or passive link between the associated discussion topic and an item or another data structure specified by the argument. The argument may include, but not be limited to, a discussion data structure for another discussion topic, selected content, a link (e.g., a URL link) to additional content, an executable script or segment of code, a date, a time, a place, an identifier for a member, follower, or group having access to the discussion data. More than one active tag and argument may be defined for a discussion data structure. The system may render active tags as an active button or active text, such that when an active tag is selected, functionality specific to the active tag may be executed. Additionally, an active tag and/or argument may be used in search queries to retrieve associated discussion data.

In some embodiments, a discussion-topic system component (e.g., a discussion-topic server or user device) may be configured to manage communications and content sharing between a first device and at least one second device. The system component may be configured to communicate over a data communications network with the first device and the at least one second device. The system component may comprise a network interface connected to the data communications network and configured to receive and transmit data, and at least one processor adapted with specific machine-readable instructions that, in conjunction with other hardware elements, control the system component to execute any one or combination of acts for discussion-topic, social networking. For example, a discussion-topic server may be configured to receive, from a first device in the network, first input naming a first discussion topic and identifying the first discussion topic as a parent discussion topic. The discussion-topic server may further receive, from the first device, second input naming a second discussion topic and identifying the second discussion topic as a sub-discussion topic of the first discussion topic, and also receive a plurality of discussion content identified to be associated with one or both of the first discussion topic and the second discussion topic. In some embodiments, the discussion-topic server may associate first discussion content, of the plurality of discussion content that is identified to be associated with the first discussion topic, with a first discussion data structure created for the first discussion topic, and associate second discussion content, of the plurality of discussion content that is identified to be associated with the second discussion topic, with a second discussion data structure created for the second discussion topic. The discussion-topic server may further enter in a relational data structure at least one entry identifying the second discussion data structure as being related hierarchically as a sub-topic to the first discussion data structure. According to some embodiments, the discussion-topic server may be configured to, in response to receiving from the first device a request that identifies the second discussion topic for display, transmit first visual feed data comprising the second discussion content to the first device for displaying on the display of the first device a first visual feed comprising a full-screen listing of at least a portion of the second discussion content. In some embodiments, the first visual feed data may not include discussion content associated with discussion topics other than the second discussion topic. The discussion-topic server may enter in a relational data structure at least one entry identifying the second discussion data structure as being related to the first discussion data structure, e.g., being related subject matter and/or classified as a sub-topic.

According to some embodiments, the discussion-topic server may be further configured to receive, from the first device, an email chain message that identifies plural email communications between the first device and the at least one second device. Responsive to receiving the email chain message, the discussion-topic server may transmit to the first device dialog data for displaying on a display of the first device an email conversion graphical interface configured to receive first user input for naming the email chain and for identifying the email chain as a parent discussion topic or a sub-discussion topic of an existing parent discussion topic. The discussion-topic server may further create a first discussion data structure for the email chain message, receive a first name for the email chain, and associate the name with the first discussion data structure. The discussion-topic server may identify a first discussion topic using the first name. The discussion-topic server may identify each email message within the email chain as a comment associated with the first discussion topic, and store each email message within the email chain in the first discussion data structure as discussion content associated with the first discussion topic. The discussion-topic server may further identify attachments for each email message as being associated with a respective comment, and store identified attachments as discussion content associated with the first discussion topic. According to some embodiments, the discussion-topic server may be further configured to identify, from the email messages, participants to be added to the discussion topic, such as by identifying addressees in the email chain.

In some embodiments, the discussion-topic server may further transmit, to the first device, dialog data for displaying on a display of the first device an email conversion graphical interface. The email conversion graphical interface may be configured to receive first user input for naming one or more users of the at least one second device that are not identified as addressees in the email chain message. Responsive to receiving the one or more users identified via email conversion graphical interface, the discussion-topic server may add the one or more users as participants in the first discussion topic.

Methods of operation are also contemplated. According to some embodiments, a method for managing communications and sharing of content between a first device and at least one second device, wherein the first device and the at least one second device are configured to communicate over a data communications network, may comprise receiving, at a first data-processing device, first input naming a first discussion topic, and receiving second input naming at least one sub-discussion topic and identifying the at least one sub-discussion topic as being hierarchically related to the first discussion topic. The method may further include receiving a plurality of discussion content identified to be associated with one or more of the first discussion topic and the at least one sub-discussion topic, associating first discussion content, of the plurality of discussion content, that is identified to be associated with the first discussion topic with a first discussion data structure created for the first discussion topic, and associating second discussion content, of the plurality of discussion content, that is identified to be associated with a first sub-discussion topic of the at least one sub-discussion topic with a second discussion data structure created for the first sub-discussion topic. According to some embodiments, responsive to receiving a request to display content associated with the first sub-discussion topic, the method may include preparing first visual feed data for displaying on a display a first visual feed comprising a full-screen listing of at least a portion of the second discussion content. The first visual feed data may not include discussion content other than content associated with the first sub-discussion topic.

Method embodiments for conventional email conversion are also contemplated. According to some embodiments, a method for converting conventional email for use in the discussion-topic system comprises receiving a conventional email message or email chain message. The method may further include, receiving first user input for naming the email chain and second user input for identifying the email chain as a parent discussion topic or a sub-discussion topic of an existing parent discussion topic. According to some embodiments, the method may further comprise creating a first discussion data structure for the email chain message, and associating the name received in the first user input with the first discussion data structure. A method for converting conventional email chain message may include identifying a first discussion topic using the first name, and identifying each email message within the email chain as a comment associated with the first discussion topic.

In some embodiments, method embodiments may be implemented in whole or in part by a discussion-topic server. In some embodiments, method embodiments may be implemented in whole or in part by a user's device in a discussion-topic system. In some implementations, some method acts may be implemented by a discussion-topic server and some may be implemented by a user's device.

Aspects of discussion-topic functionality and content sharing include tangible data-storage devices embodying machine-readable instructions that may be executed on a machine, e.g., by a processor of the machine, to adapt the machine to perform processes associated with discussion-topic communications and content sharing.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

FIG. 3B depicts a discussion-topic-creation interface, according to some embodiments;

FIG. 4A depicts a second user-interface that may be displayed by a device configured to execute discussion-topic, social network functionality, according to some embodiments;

FIG. 4D depicts a hierarchical visual feed of files associated with discussion topics, according to some embodiments;

FIGS. 5A-5D illustrate graphical user interfaces that may be used to define active tags and associated arguments, according to some embodiments;

FIGS. 7A-7B illustrate search interfaces that may be displayed by a device configured to execute discussion-topic, social network functionality, and search queries relating to active tags that may be processed, according to some embodiments;

FIG. 8A depicts information associated with conventional email that may be imported and converted to a discuss topic data structure, according to some embodiments;

Figure 1A:
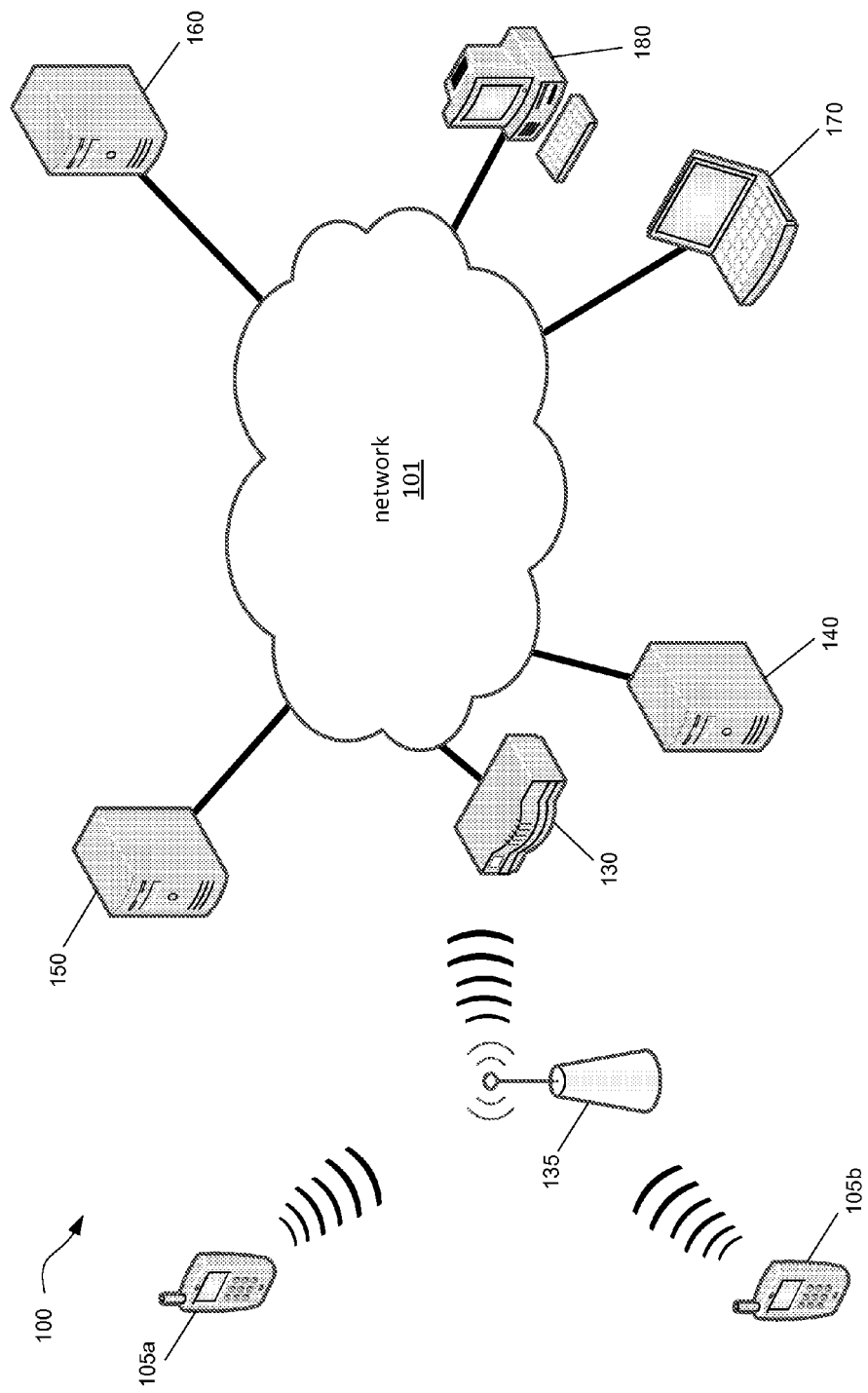
FIG. 1A depicts various devices configured to operate in a data-communication network. One or more of the devices may be configured to execute discussion-topic, social network functionality, according to some embodiments.

The features and advantages of the present invention will become more apparent from the detailed description set forth below when taken in conjunction with the drawings.

DETAILED DESCRIPTION

I. Introduction

Described are systems and methods that facilitate the sharing of digital information between users of networked devices, wherein user groups for exchanging information may be defined in association with discussion topics. In various embodiments, the shared information is organized by the system for a user's convenience and presented to the user according to user-defined discussion topics. For example, a first user of a first device may define a discussion topic via a user-interface (e.g., by entering a descriptive label or name for the topic at the first device) and enter a comment or message and/or attach content relating to the discussion topic. The first user may identify and invite, via a user interface at the first device, a selected number of other users to participate in informational exchange relating to the defined discussion topic. At least one of the networked devices, e.g., a user's device and/or a discussion-topic server, may maintain a record of all informational exchanges and associated content relating to the discussion topic, so that participating members can search for, retrieve, and review historical data for the discussion topic. Discussion data structures may be created, by at least one user device or a discussion-topic server, for each discussion topic. Discussion topics may be hierarchically structured into multiple levels, which may include parent discussion topics and sub-discussion topics of one or more parent discussion topics. A relational data structure may be maintained, by at least one user device or a discussion-topic server, that records hierarchical relationships between discussion topics (e.g., parent topic, sub-topic). Attached content (e.g., images, files, video, digital audio, etc.) may be associated with any discussion topic. Because the system automatically organizes and presents shared content according to discussion topics, an organizational burden associated with conventional email exchanges is reduced for a user. For example, a user need not sort (e.g., drag and drop) emails or comments into folders and sub-folders created by the user, and subsequently search the folders for desired information.

Included in the system is functionality for flexibly defining active tags in association with a discussion topic. An active tag may comprise a descriptive name and an associated argument, and may identify an active or passive link between a discussion data structure for a discussion topic and an item or action specified by the argument. An active tag may be defined by a user entering data at a device to specify a descriptive name for the active tag, or by a user selecting a predefined active tag from a list presented to the user. The user may also define or select the argument. One example of an active tag may be a linking active tag. For example, a user may define an active tag for a first discussion topic as "#relevant_information," and specify as an argument the name of a second discussion topic. The system may receive the data entered by the user and create an active tag metadata structure identifying the active tag. The active tag metadata structure may be associated with a data structure for the first discussion topic. In some embodiments, the system may associate code or an executable script with the active tag. The system may subsequently render on a display of a user's device in association with the first discussion topic an active button or active text representative of the active tag. A user's selection of the active tag (e.g., clicking on the active tag) may provide a signal to the system so that the system launches the code or executable script associated with the active tag and executes functionality associated with the active tag, e.g., changes a display for the user from one associated with the first discussion topic to a display associated with the second discussion topic. Additional examples of active tags and associated arguments are described below.

The discussion-topic system may interface with conventional email applications in some embodiments. For example, email chains responding to a same subject line may be forwarded to and received by the discussion-topic system, and converted into a discussion topic format. Email messages with the chain and attached content may be organized by the system in association with a discussion data structure named and created for the email chain. The discussion data structure may be identified as a discussion topic having a name taken from the subject line of the email chain or received from naming data entered by a user. Past and future email exchanges corresponding to the discussion topic that are converted into discussion data for by discussion-topic system can be easily reviewed, searched, and responded to without a user having to sort through a list of unrelated emails. New emails received in the chain may be automatically displayed in a discussion-topic format showing only related content associated with the newly-created discussion topic for the email chain. When converted for use in the discussion-topic system, a user need not create folders and organize emails into the folders.

II. Overview of Discussion-Topic Social Network Systems

Figure 1B:
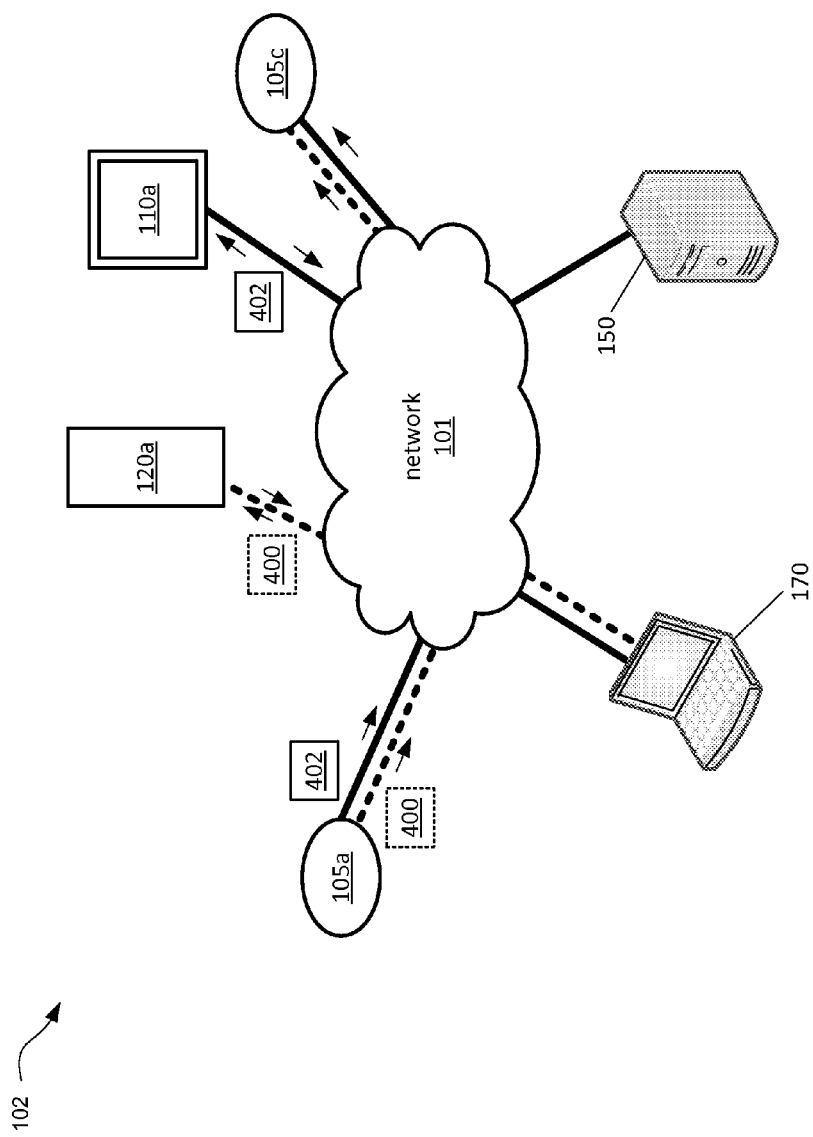
FIG. 1B depicts a system configuration in which some devices may be configured to execute discussion-topic, social network functionality wherein communications between the devices may be mediated with action metadata messages 400; according to some embodiments.

With reference to FIGS. 1A-1B and as an overview of the discussion-topic system, a first device 105a adapted for discussion-topic, social network functionality allows a first user of the first device to share content, organized according to discussion topics, with other users of other networked devices, wherein the other users are identified as being permitted to view and/or modify the shared content by the first user. In various embodiments, the first user of the first device 105a may define a discussion topic for which associated data is shared among selected members via a network 101, 102. The devices may be configured to exchange data in a data communications environment 100 that includes components shown in FIG. 1A, or in a data communications environment 102 that includes components depicted in FIG. 1B. Additional or fewer devices may be connected to either data communication environment in some embodiments. The two data communications environments may be connected in some embodiments, and components from one data communication environment 101 may be used in another data communication environment 102, and vice versa.

Communications between user-operated devices in a discussion-topic system may be managed or assisted by a discussion-topic server 140, 120a, according to some embodiments. A discussion-topic server may comprise a single server or a server farm, and may include at least one microprocessor and data communication apparatus. Data associated with discussion topics that is to be transmitted from a first device to a second device may, in some embodiments, be identified to the discussion-topic server. The discussion-topic server may maintain a record of all data associated with each discussion topic, and may maintain a relational record that identifies hierarchical relationships between discussion topics. The discussion-topic server may, in some embodiments, transmit data to a user's device that allows the user's device (e.g., via a web browser) to display graphical user interfaces that allow a user to access discussion content for selected discussion topics.

According to some embodiments, a discussion-topic server 120a, 140 and/or data node in the network may store discussion content for all discussion topics. Further, a discussion-topic server 120a, 140 may provide login, account, and computer code resources that enable users to interact with the discussion-topic system. In other embodiments, discussion content associated with discussion topics to which a user is a participant may be stored on the user's device and only temporarily at data nodes in the network. In some embodiments, a user's device may be configured with machine-readable instructions such that a user may access, modify, and/or add discussion content associated with one or more discussion topics when the user's device is off-line.

As a non-limiting example of sharing discussion content associated with a discussion topic, the first user may operate a first device 105a and enter a discussion-topic identifier (e.g., an alphanumeric data string "family_reunion_2015") at the first device that indicates the subject matter of the discussion topic. The discussion-topic identifier may be used by the various devices to identify an associated discussion data structure. The first user may invite selected participants (e.g., family members, in-laws, and relatives) to participate in or view network discussions and/or actions associated with the discussion topic, by entering participant identifiers at the first device in association with the discussion-topic identifier. The first user may also designate access privileges for each participant. The first user may post a comment relating to the discussion topic, by entering the comment as a data string at the first device. A discussion-topic message including the comment may be made available (e.g., available for downloading when a participant accesses the discussion-topic system) to the selected participants' devices and displayed in association with the discussion-topic identifier for the participants to review and further comment. Some participants may be permitted to reply to the posted comment and add to the discussion data structure. Some participants may only be permitted to view the posted comments and not post a reply. In various embodiments, participants that post or reply to comments within a discussion topic may attach additional discussion content to a comment. The additional discussion content may comprise any type of data, e.g., a photo, a video, an audio recording, a document, a script, a URL link, computer code, etc. Because all comments and additional content are associated with a discussion topic, the information may be readily searched by subject matter for subsequent review (e.g., searched using the discussion-topic identifier in a search query).

In some embodiments, a conventional email chain of messages replying to a common subject line may be forwarded to a user's account in the discussion-topic system and converted into a new discussion-topic data structure. The subject line of the email, or a name selected by the user, may become the discussion-topic identifier, and the individual messages may become comment postings within the discussion topic. Participants of the discussion topic may be those entities identified in the address, carbon copy (cc) line, and the blind carbon copy (bcc) line of the email messages within the email chain. Additionally, the user may add additional participants at the time of converting the email chain.

In some embodiments, a device adapted for discussion-topic, social network functionality may be further configured to allow a user of the device to define at least one active tag that is associated with a corresponding discussion topic. The active tag may be flexibly created by a user, in some embodiments, or may be selected from pre-defined active tags. An active tag may be used to establish a link between a discussion topic and an item or action identified by the argument of the active tag. In this regard, an active tag may function as a predicate that takes on a user-defined or user-selected argument. The active tag argument may be flexibly defined by a user or may be selected by the user from pre-defined data types that are provided to the user. The argument may comprise, but not be limited to, an alphanumeric text string, a link to other content (e.g., a URL, a file name, a label for another discussion topic), a date, a time, a place, a link to a script or executable code, a link to a photograph, video or audio recording, a participant identifier or a group identifier. More than one active tag and argument may be defined for a discussion topic.

As an example of an active tag and following the "family reunion" example above, an active tag may comprise a descriptive alphanumeric string defined by the user (e.g. "#dessert_dishes") in association with the discussion data structure. The user may define or select as an argument an identifier for at least one of the family members (e.g., @rachel) or a sub-group of family members, so as to indicate that those family members are responsible for bringing desserts to the family reunion. A member of the discussion group may define another active tag and argument for the discussion data structure relating to dessert suggestions (e.g., a user may define "#dessert_suggestions" as an active tag and "www.bestdesserts.org" as an argument for the active tag). A user activating an active tag may jump to the web site "bestdesserts.org." Active tags and arguments may be transmitted for display at all member devices. Additionally, content stored by the system may be searched using active tags and/or arguments. In some embodiments, active tags and arguments may be used to implement specific system functionality, such as implementing voting or rating functionality among members of a discussion topic.

Discussion data for multiple discussion topics may be searched in several ways. Because discussion data is already organized around discussion topics and presented to a user in association with a discussion topic, it may be readily reviewed in some instances by scrolling through a visual list or feed of discussion-topic content presented to a user. Alternatively, discussion data may be searched using user-entered search queries. Search strings may include active tags and constraints on active-tag arguments, and may further include Boolean expressions. A user may identify restrictions on searches, e.g., limiting the search field to data associated with a selected discussion topic and/or a selected active tag within the selected discussion topic. A search engine associated with a discussion-topic server may be configured to recognize active tags, their associated arguments, and constraints on active-tag arguments, and return results relevant to the search strings entered by a user.

III. Embodiments of Discussion-Topic Social Network Apparatuses

Discussion-topic, social network functionality may be implemented in different manners in the two network environments depicted in FIG. 1A and FIG. 1B. In FIG. 1A, a discussion-topic server 140 may host discussion-topic services that are accessed by client or user devices via web browsers. In FIG. 1B, discussion-topic services may be distributed among content share servers 120a, data nodes 110a, and user devices.

Referring to FIG. 1A, a network 101 may comprise a piconet, micronet, local area network (LAN), medium area network (MAN), wide area network (WAN), or a combination thereof. Connections to the network may be wired or wireless. The network 101 may include connections to other networks, such as a cellular-phone or mobile-device network that may include one or more transmission antennas 135 or relay stations and base stations 130. There may be one or more firewalls (not shown) located between the network 101 and a local area network of a plurality of devices, such as an enterprise or agency network.

There may be one or more servers 140, 150 or data nodes 160 connected to the network 101. The servers may provide any variety of network services. At least one server 140 may comprise a discussion-topic server configured to provide discussion-topic services to a plurality of user devices 105a, 105b, 170, 180. In some embodiments, a server for a particular on-line service may comprise a single server 150 or may comprise a plurality of servers, e.g., a server farm, according to some embodiments. In some implementations, a server may include one or more local data storage nodes. The devices, data nodes, and servers may be configured to transmit and receive discussion content within the data communications environment 100. Discussion content may be stored indefinitely at a discussion-topic server or cloud data nodes identified by a discussion-topic server.

In some implementations, a system for implementing discussion-topic, social network functionality may utilize a content share server 120a and super data node 110a as depicted in FIG. 1B and described in further detail in U.S. Pat. No. 8,447,801 titled "Content Sharing with Limited Cloud Storage" filed Nov. 1, 2012, which is incorporated herein by reference in its entirety. Briefly, in a content sharing system with limited cloud storage, content share servers 120a and super data nodes 110a may be configured to mediate the sharing of some or all of discussion content between two or more devices (e.g., devices 105a and 105c) that are operated by users participating in or following a discussion topic. Responsive to receiving identification of a discussion topic, at the first device 105a, and/or receiving a posting of related comment, the first device may initiate the transmittal of an action metadata message 400 from the first device to a content share server 120a. The action metadata message may be transmitted, modified or unmodified, to participants identified for the discussion topic. Additionally, discussion content related to the discussion topic, created or attached by the first user, may be transmitted to a super data node 110a for temporary storage. Upon receiving an action metadata message 400, at least one participant device 105c (and/or 170) may contact the super data node 110a and/or first device 105a to obtain a copy of the content created or attached by the first user. Content portions 402 may then be transmitted to the at least one participant device. In some embodiments, the transmittal and receipt of action metadata messages and content portions executes automatically at the participant devices 105a, 105c, and/or 170 responsive to a modification or addition of discussion content for a discussion data structure. Discussion content may include posted comments as well as attached content.

In an embodiment like that described for FIG. 1B, a majority of discussion content may be retained in local copies on participant devices. For example, super data nodes 110a may delete content according to administrator-defined file-retention rules. In some embodiments, a super data node 110a may be configured to delete content on a least-recently used cache basis, or on an expiration date basis. Such an embodiment may be desirable for security reasons, e.g., the content is only in network data nodes (where it may be hacked) for a limited time.

Figure 2:
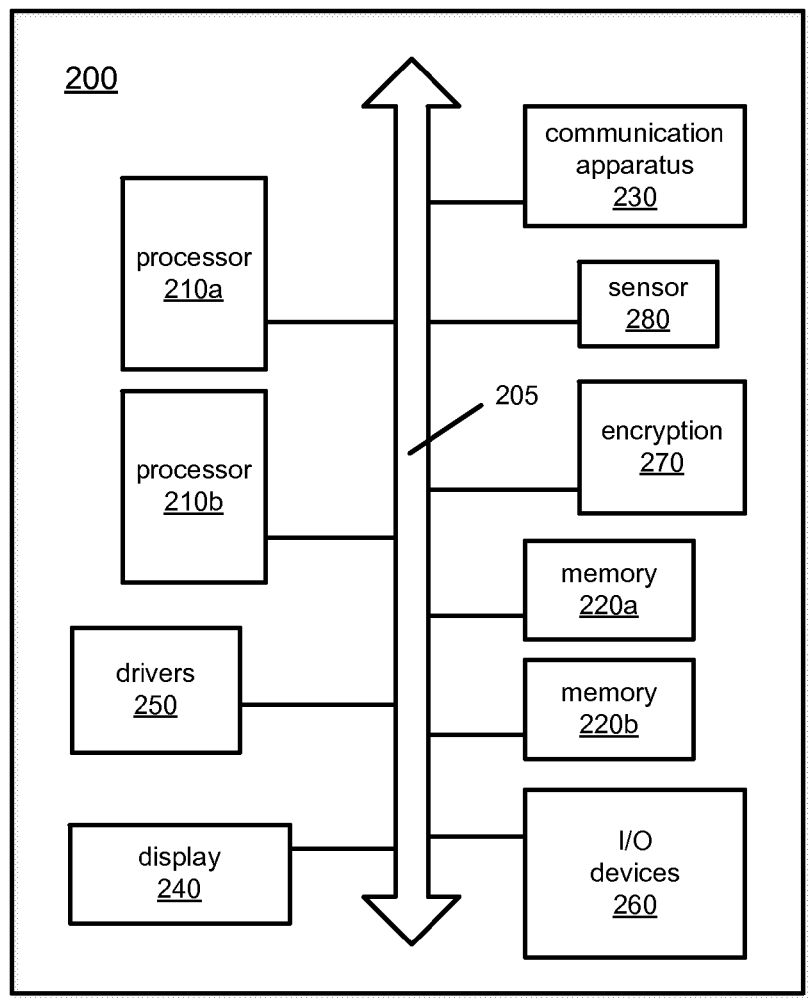
FIG. 2 is a block diagram representing components of a device configured to execute discussion-topic, social network functionality, according to some embodiments.

Referring now to FIG. 2, an electronic data-processing device 200 that may be adapted to execute discussion-topic, social network functionality may comprise at least one processor 210a, 210b and related hardware, as depicted in FIG. 2. The at least one processor may be configured to control and provide user interaction for operating the device. The at least one processor may be used in combination with memory devices 220a, 220b. The memory may include any type and form of RAM-type memory device and ROM-type memory device. A memory device may store machine-readable instructions that can be loaded onto and executed by the at least one processor to specially adapt the at least one processor and device 200 to perform discussion-topic, social network functionality. When in operation, an operating system may execute on at least one processor and provide for user interaction and operation of the electronic device 200, which may include running multiple software applications and/or programs on the device.

An electronic device that may be adapted to execute discussion-topic, social network functionality may include fewer or more components than those shown in FIG. 2, and may be embodied as, for example, mobile device 105a, laptop computer or netbook 170, or personal computer or workstation 180. A mobile device may include a smart phone, a cell phone, a pad computer, a tablet computer, a personal digital assistant, etc.

According to some embodiments, a processor 210a, 210b may comprise any type and form of data processing device, e.g., any one or combination of a microprocessor, microcontroller, a digital signal processor, an application specific integrated circuit (ASIC), and at least one field-programmable gate array (FPGA). There may be more than one processor in the system in some embodiments, e.g., dual core or multicore processors, or plural processors communicating with at least one controlling processor. In some embodiments, one or more functionalities of discussion-topic may be implemented by a dedicated FPGA or ASIC.

The electronic device may further include a display 240 (e.g., comprising any one or combination of a video monitor, an LCD display, a plasma display, an alpha-numeric display, LED indicators, etc.). The electronic device 200 may further include one or more input/output devices 260 in some embodiments (e.g., keyboard, touchpad, buttons, switches, touch screen, microphone, speaker, printer), and communication apparatus 230 (e.g., networking software, networking cards or boards, wireless transceivers, and/or physical sockets). The electronic device 200 may include device drivers, e.g., software modules specifically designed to execute on the one or more processor(s) and adapt the processor(s) to communicate with and control system components. In some embodiments, the device includes encryption/decryption hardware and/or software 270 that may be used to encrypt selected outgoing data transmissions and decrypt incoming encrypted data transmissions. Components of the electronic device 200 may communicate over a bus 205 that carries data and control signals between the components. The bus may provide for expansion of the system to include other components not shown in FIG. 2.

In some embodiments, the device 200 may include at least one sensor 280. The sensor may include one or more magnetometers, e.g., an integrated circuit device configured to sense magnetic field along at least one axis. Any suitable type of magnetic sensor may be used in some implementations. In some embodiments, a magnetometer senses magnetic field along three orthogonal axes and generates magnetic field data representative of sensed values of magnetic field along the three axes. The at least one sensor 280 may include additional sensors, e.g., one or more accelerometers, one or more gyrometers, a photosensor array for recording images, an audio sensor.

In some embodiments, machine-readable code may be stored in memory 220 on a device 200 and launched during operation of the device to adapt the device 200, including at least some of its hardware components, to perform discussion-topic functionality in accordance with the methods and systems described. In some implementations, a device 200 may execute code to adapt it to function as a discussion-topic server 140 or content sharing server 120a that supports discussion-topic functionality. In some implementations, a device 200 may execute code to adapt it to function as a user device 105a, 105b, 170, 180 that supports discussion-topic functionality.

Figure 3A:
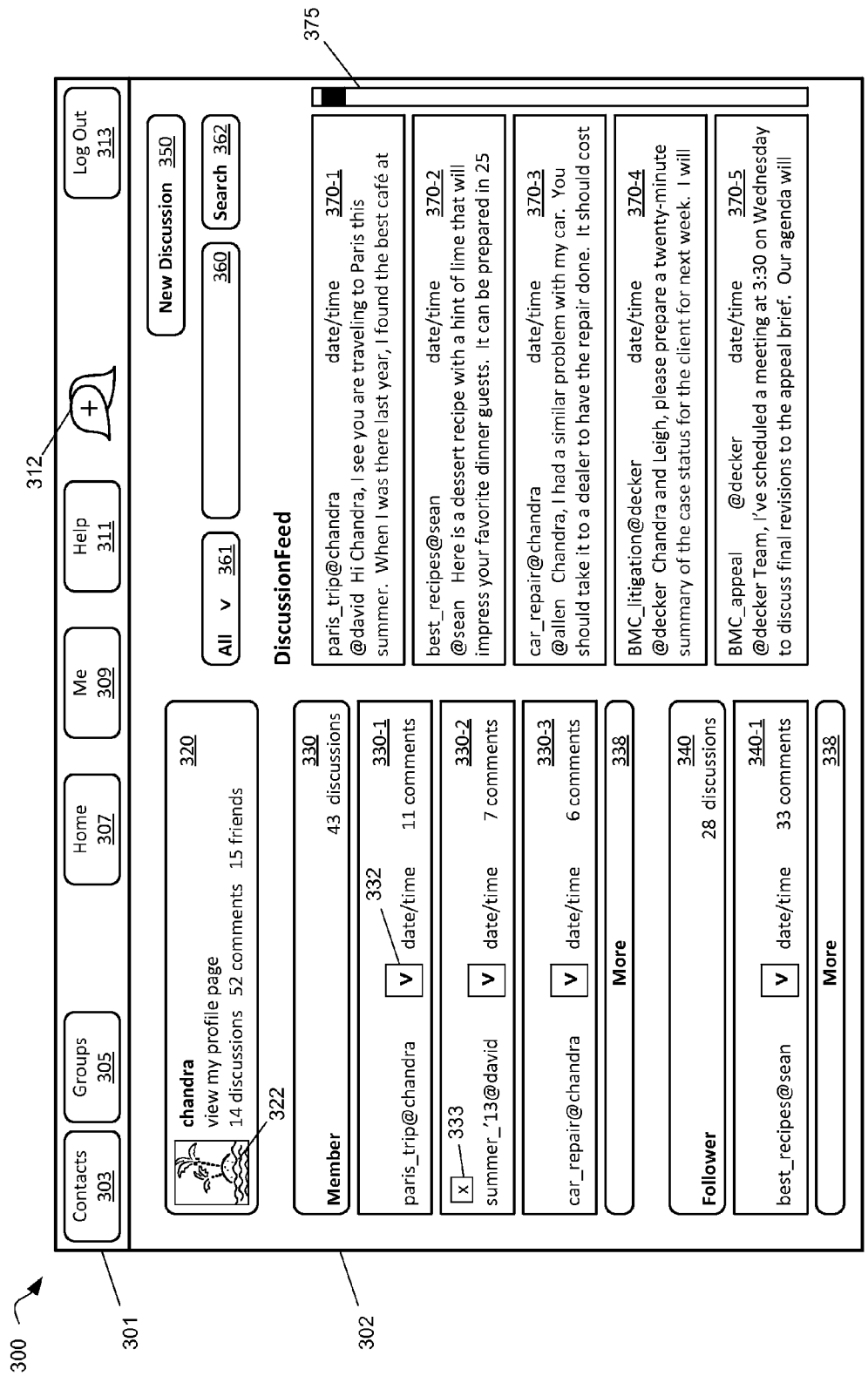
FIG. 3A depicts a first user-interface that may be displayed by a device configured to execute discussion-topic, social network functionality, according to some embodiments.

FIG. 3A depicts an example of a display screen 240 of a data-processing device 200, exemplifying how the device may be adapted to execute discussion-topic functionality, according to various embodiments. Machine-readable code may be executed by at least one processor of a user's device to cause display of an interactive log-in page (not shown). A user may register and/or log into the discussion-topic system by entering identifying and/or authenticating data. A discussion-topic server 140 may authenticate the user and then provide discussion-topic services to the user. After log-in, the user's device may display an interactive "user page" or "front page" 300 depicted in FIG. 3A. At least some data for display of the front page 300 may be received from the discussion-topic server 140.

A front page 300 may provide an overview of discussion topics and recent comments relevant to a user. A user's front page 300 may be partially arranged by a user, in some embodiments, to include more or fewer items than shown in FIG. 3A. In some implementations, the front page may comprise a basic framework defined by an administrator of the discussion-topic system that cannot be changed by a system user. According to some embodiments, the front page 300 includes a menu bar 301 and a main window 302. The menu bar may include quick-access and/or quick navigation buttons or icons for common or frequently-used system tasks. The main window 302 may comprise a collection of information relevant to the user and discussion topics for which the user is a participant. For example, the main window may contain a user summary 320, a listing of member discussion topics 330 for which the user is a member, and a listing of follower discussion topics 340 for which the user is a follower. The main window 302 may further include a discussion feed, e.g., a listing of most recent comments and/or one or more comments from the most active discussion topic within a recent time period. According to some embodiments, the front page 300 may include an interactive search panel 361, 360, 362, and may include one or more active buttons for executing specific tasks, e.g., a discussion-creation button 350.

According to some embodiments, the menu bar 301 may include interactive features, drop-down menus or drop-down lists that may be selected by a user to execute discussion-topic functionality. The interactive features may be displayed as icons, active text, or text-fill boxes. In some embodiments, a "contacts" button 303 may be displayed and, when selected by a user, toggle a drop-down list of contacts, or may toggle a drop-down menu from which the user may select menu items to add or remove contacts or list contacts. The contacts may be defined by the user and correspond to identifiers for participants in discussion topics to which the user also belongs. According to some embodiments, a contact or user may be defined as a special globally-recognized character included at a standardized position in a descriptive string, e.g., @jerrym, where "@" represents a special character indicating that the data is representative of a contact. In some embodiments, a contact may be defined by any alphanumeric string. The defined contact may be associated with an internet address or email address that is used to route information to a corresponding participant. The contact-to-address translation may be executed at the user device, e.g., user device 105a, or may be executed at a discussion-topic, content share server 140. A "groups" button 305 may perform similar functionality with respect to user-defined groups of users.

A front-page menu bar 301 may further include navigational buttons. For example, a "home" button 307, when selected by a user, may cause the user's device to display a home page for the discussion-topic system. A "me" button may prompt the device to display a profile page for the user, or may display a drop-down menu from which the user may select menu items to update or review the user's profile page. The front page menu bar 301 may further include "help" 311 and "log out" 313 buttons.

According to some embodiments, a front page menu-bar 301 may include a comment creation icon 312. When the comment creation icon 312 is selected by a user, the device may provide an interactive comment interface (e.g., as a pop-up window) with which the user may enter a comment associated with a selected discussion topic. The selected discussion topic may be highlighted by the user in the main window 302 of the front page, according to some embodiments, so as to identify with which discussion topic the comment is associated. In some embodiments, the user may identify the discussion topic for which the comment is associated via the interactive comment interface. There may be more or fewer active buttons or icons on the menu bar 301 of the front page 300.

In some implementations, the icon 312 may serve two purposes, depending on which page is currently displayed for a user. For example, when the front page 300 is displayed, the icon 312 may be recognized by the device to cause, when selected, a discussion-topic creation interface (described below) to be displayed. When a "discussion page" 400 (FIG. 4A) is displayed, the icon may function as the comment creation 312 described above, and may be recognized by the device to cause, when selected, the interactive comment interface to be displayed.

According to some embodiments, a front page main window 302 may include an interactive discussion-topic creation icon 350 or button. When this icon or button is selected by a user, the device may present an interactive discussion-topic creation interface 380, as depicted in FIG. 3B, to the user with which the user may enter a discussion identifier, e.g., a descriptive alphanumeric string, such as "family_reunion_2015" from the example above. The discussion identifier may be descriptive of a discussion topic, for which the user would like to solicit comments or discussion from others. The user's device, independently or in collaboration with at least one other device (such as a discussion-topic server 140) connected to the network, may create a discussion data structure to be associated with the discussion topic. In some embodiments, the first device may transmit the discussion identifier to a server 140 that creates a corresponding discussion data structure, and maintains a record of the discussion data structure. In some embodiments, a discussion data structure may be created by a user's device and subsequently transmitted to a discussion-topic server.

The interactive discussion-topic creation interface 380 may comprise several data entry windows for user interaction, as illustrated in FIG. 3B. The interface may be presented to a user at a user's device responsive to a selection by the user of an icon or active text designating creation of a new discussion topic. The interface 380 may include a discussion-topic name window 382 configured to accept an alpha-numeric string for naming the newly-created discussion topic. A description window 384 may be provided, and configured to accept text for describing the discussion topic. The descriptive text may be displayed automatically to members of a discussion-topic group, e.g., displayed in a description panel 420 of a discussion page, as depicted in FIG. 4A.

In some embodiments, a discussion identifier or name entered by a user (e.g., "family_reunion_2015") may be modified automatically by the user's device or a server 140, so that the identifier indicates the originator of the discussion topic. An identifier for the user who created the discussion topic may be appended to or otherwise associated with the discussion identifier. Following the example above, in some implementations, the user's device or a server may modify "family_reunion_2015" to "family_reunion_2015@robert" where "robert" may be an identifier for the user who created the discussion identifier "family_reunion_2015" for a corresponding discussion topic.

According to some embodiments, a tag window 386 may be provided, and configured to accept strings for defining active and/or descriptive tags. Descriptive tag data may be entered by a user and used by the discussion-topic system to organize, identify, and search for discussion topics and/or associated discussion content. For example, a descriptive tag may comprise a hashtag like those used in social network systems such as Twitter. In some embodiments, active tags may be defined by a user for a discussion topic using the tag window 386. The discussion-topic system may recognize active tags and execute additional functionality in association with active tags, such as data linking.

A relational button 387 or active text may be included with the discussion-topic creation interface 380 and used to define a hierarchical relation between the newly-created discussion topic and a previously defined discussion topic. A user selecting the relational button 387 may cause the system to display a relational graphical interface with which the user may select or enter data identifying another discussion topic and select or enter a relation (sub-topic, parent) to the other discussion topic. The discussion topic creation interface 380 may further include an invitation button 390 or active text that may be selected by a user to identify one or more participants that the user wishes to invite to the discussion topic. Selection of the invitation button or text may cause the system to display an invitation graphical interface with which the user may select or enter data identifying one or more participants and select or enter data identifying a participant status for each participant. In some embodiments, the invitation graphical interface may be configured to accept definitions of participant access privileges.

The discussion topic creation interface 380 may further include a "cancel" button 389 or active text, and an "add discussion" button 388 or active text. Selection of the add discussion button may finalize creation of the new discussion topic. Data entered or selected at a user's device may be buffered until the add discussion button is selected. Thereafter, the data may be processed by the system to create a discussion data structure associated with the newly-defined discussion topic, update a relational database to represent a hierarchical relation of the newly-created discussion topic to a previously-created discussion topic if applicable, and to invite participants to the new discussion topic.

An interactive discussion-topic creation interface 380 may further provide visual aids and functionality for the user to define participants that are permitted access to the discussion data structure that is associated with the newly-defined discussion topic. According to some embodiments, the discussion-topic creation interface may be configured to receive participant identifiers for system users, and to receive privilege designations set by a user to define access privileges for the identified participants. For example, a user creating a discussion topic may identify a plurality of participants who the user wishes to invite as participants in the discussion topic, and the user may designate some participants as members and others as followers for the discussion topic. According to some embodiments, a user may click on an "Invite" button 390, that may prompt the device to present a drop-down list of members and groups belonging to other discussion topics to which the user belongs. The user may select members from the list, e.g., by clicking on their names or identifiers. An "Invite" button may also prompt the device to present a text entry window in which a user may enter names and/or identifiers for others that the user wishes to invite as a participant in the discussion topic.

Members and followers may be allowed to participate in network interaction relating to a discussion topic in different ways. A member may have privileges that are different from followers. For example, a member may be allowed to reply to a comment and/or initiate a comment relating to a discussion topic, and a follower may view comments but may not be permitted to reply, in some embodiments. In some implementations, privileges for members and followers may be set by the administrator or creator of the discussion topic. For example, an administrator may set privileges such that a follower may not be permitted to view or receive content attached to posted comments. In some embodiments, a user who creates a discussion topic may designate another user to be an administrator of the discussion content.

An interactive discussion-topic creation interface 380 may provide for additional functionality. For example, the discussion-topic creation interface may be configured to receive user input for deleting or archiving a discussion topic that is administered by the user. In some embodiments, the discussion-topic creation interface may be configured to receive user input for identifying the discussion topic as a sub-topic or parent topic of another discussion topic.

Because discussion topics may be related as sub-topic and parent topics, a discussion-topic server 140 and/or user device may maintain a relational data structure that identifies hierarchical relationships between discussion topics and/or their respective discussion data structures. In some embodiments, the hierarchical relations may be entered in a tabular data structure in which an entry for each discussion topic identifies one or more relations between that discussion topic and corresponding one or more other discussion topics as parent (super-topic) or sub-topic.

In some embodiments, an interactive discussion-topic creation interface 380 may not be presented to a user if the user has not been given permission to create a sub- or super-topic for a discussion topic. According to some embodiments, members and followers may have restricted and/or varying permissions with respect to designating sub-topics and/or super-topics of a discussion topic, as set by an administrator of the discussion topic. In some embodiments, an administrator of a first discussion topic may be the only participant allowed to designate a second discussion topic as being a super-topic discussion of a first discussion topic that was created before the second discussion topic. However, in other embodiments, an administrator may set super-topic and sub-topic designation privileges for each discussion topic created by the administrator. In some embodiments, members may be permitted to create and designate sub-topics, whereas followers may not designate sub-topics. Other combinations of permissions may be designated by an administrator.

When administrators, members and/or followers create and designate sub-topics or super-topics, a user's device and/or a discussion-topic, content-sharing server may be configured to automatically invite all participants to be members or followers of the newly-created discussion topic, according to their prior participant status. For example, members and one or more administrators of a discussion topic from which the sub- or super-topic is created, may automatically become members of the newly-created discussion topic, whereas followers remain followers (unless a follower created the new discussion topic, in which case that follower may become an administrator and member of the new discussion topic.)

In some implementations, followers may spawn discussion topics related to a pre-existing discussion topic. Even though the followers may not be permitted to designate a spawned discussion topic as a sub-topic, the spawned discussion topic may be designated in the system as being related to the pre-existing discussion topic. A special naming convention may be used to uniquely identify each spawned topic. For example, a first discussion topic may be identified in the system as "health_care@CTMinc" for which executives of a company (CTM, Inc.) may be members, and may be discussing merits of changing health care coverage for all employees of the company. ("CTMinc" may be a system-wide identifier for the company and correspond to an in-box for the company. All company employees may be invited as follower participants in the first discussion topic, but not have privileges to designate sub-discussion topics.

According to some embodiments, a follower may spawn his or her own related discussion topic using a selected and special naming convention recognized by the system. For example, the follower (@fredm) may name the related discussion topic "health_care_commentary@fredm". The appendage of a special term such as "commentary" or "feedback", or appendage of special characters, to the discussion identifier may, in some embodiments, cause such spawned discussion topics to be displayed to the members of the first discussion topic as well as those participants identified by the user @fredm, but not linked as a sub-topic or super-topic to the discussion topic "health_care". If there are multiple spawned discussion topics, their display at the member devices may be ranked in order of most active to least for the members' convenience. In this manner, the members may be able to readily and informally review (e.g., upon request) popular sentiment relating to the first discussion topic, without the system adding the members to a potentially large number of sub-discussion topics or linking a large number of sub-discussion topics to the members' first discussion topic. This allows for a large number of followers of a discussion topic, and for their comment or feedback on a discussion topic to be reviewed by members, without adding an inconveniently large amount of discussion content data to the members' discussion data structures.

As noted above, creation of a discussion topic involves defining a discussion identifier that may be uniquely recognized by the discussion-topic system, and creating, by the user's device, alone or in cooperation with a discussion-topic server, a related discussion data structure. To uniquely define discussion identifiers for a discussion-topic system, a discussion-topic server 140 may append to a name entered by a user a time of creation for the discussion topic. In further detail regarding a discussion data structure, a discussion data structure may comprise a record data type that includes a plurality of data fields. For example, one field may include the discussion identifier. Another field may contain a comment posted by a participant in the discussion topic. Another field may contain date and time information as to when a comment was posted. Another field may contain a link to or name of additional content that was attached to a comment when the comment was posted or that was uploaded directly to a discussion-topic data structure. Other data fields may contain statistical data and/or informational data about a discussion topic (e.g., number of participants, number of comments, date of most recent comment, date of initial comment, administrator of discussion topic, members, followers, sub-discussion topics, super-discussion topics, etc.) Other data fields may contain statistical data and/or informational data about a comment (e.g., number of "likes," date of posting, identity of participant posting the comment, etc.) In some embodiments, a discussion data structure may be organized as separate files that include linking metadata to identify the separate files as being associated with a same discussion topic.

In some implementations, a discussion-topic server may maintain or have access to a record of all uniquely-defined discussion data structures and associated relational data records identifying parent and sub-topics. A discussion-topic server may update the discussion data structures with discussion content as new discussion content is received. The discussion-topic server may further make available the updated discussion data structures and associated discussion content to networked user devices that subscribe to the discussion-topic system.

In some embodiments, a user device 105a may store and maintain locally a discussion data structure for each discussion topic in which the user participates. In some implementations, discussion data structures may be maintained at designated data nodes 160, 110a in the network. According to some embodiments, a user's device may be configured to update its local discussion data structure when content is added to a discussion data structure (e.g., a new comment is posted by the user), when content associated with a discussion data structure is modified (e.g., a document attached to a comment is modified by the user), or when the device receives an indication (e.g., an action metadata message or a message containing new content) from another networked device that a discussion data structure has been modified. If the updating is responsive to receipt of an action metadata message, the user's device may contact a super data node 110a and/or another participant's device to obtain an updated record for the discussion data structure.

Returning to FIG. 3A, the main window 302 may include a statistics and information summary 320 for the user. The summary 320 may include a thumbnail image or icon 322 selected or created by the user that the user wishes to associate with their network identity. For example, the thumbnail image 322 may be appended to comments posted by the user and displayed on the participants' displays in association with the user's comments. The user summary 320 may include various information and/or statistics, e.g., information about the number of discussion topics administered by the user, a number of comments received during a logged out period and/or a number of comments not reviewed by the user, a number of contacts, friends, member contacts, followers, etc. The summary may include a number of discussion topics to which the user belongs as a member or follower. There may be additional or less information depicted in the user summary 320.

In some embodiments, the user summary 320 may include active text and/or active buttons. For example, some text may be selected to navigate to a new page (e.g., navigate to the user's profile page by clicking on the user's network ID "chandra" or on descriptive text "view my profile page"). In some implementations, an expand icon (not shown) may be selected by the user to temporarily expand the user summary 320 to display additional information.

The main window 302 of the front page 300 may further include listings 330, 340 of discussion topics for which the user is a participant. A member listing 330 may display informational panels 330-1, 330-2, 330-3 corresponding to discussion topics to which the user is a member (including those administered by the user). The panels displayed may be ordered so as to correspond to discussion topics most recently and/or most frequently accessed by the user. Similarly, a follower listing 340 may display informational panels 340-1 corresponding to discussion topics for which the user is a follower. The listings of discussion topics may identify each discussion topic as a parent or sub-discussion topic. A parent discussion topic and its sub-discussion topics may be grouped together, in some embodiments. Sub-discussion topics may be collapsed and expanded by selecting a parent discussion topic.

Each displayed discussion-topic panel 330-n, 340-n may include a discussion-topic identifier (e.g., "paris_trip@chandra"), a number of comments posted for the discussion, a date and time of the first comment posted and/or most recent comment posted, or of the most recent modification made to the discussion data structure or content linked to the discussion data structure (e.g., modification of a document attached to a prior comment). In some embodiments, a user's device may be configured such that clicking on a discussion-topic panel (e.g., panel 330-2) toggles the front page to a discussion page as depicted in FIG. 4A.

In some embodiments, a user may disengage from a discussion topic. For example, an interactive engagement icon 333 may be provided to a user in association with a discussion topic for which the user is a non-originating member or follower. Activating the icon may be recognized by the system and allow a user to disengage from a discussion topic on a permanent basis or temporary basis. When disengaging permanently, a user's device may notify a server to remove the user from the discussion-topic group. The user may then no longer receive content relating to the discussion topic, unless the user re-accepts a subsequent invitation. When disengaging temporarily, a user's device may notify a server to hold all content directed to the server until the user re-engages in the discussion topic. Upon re-engagement, the user may elect to receive all held content accumulated during the period of disengagement, or to receive only content from the time of re-engagement and forward in time.

Also included on the front page 300 may be a discussion feed portion listing recent comments and/or one or more comments 370-n associated with one or more discussion topics in a recent time interval. A recent time interval may be a statically defined interval (e.g., a day, a week), or may be a dynamic time interval (e.g., a time interval since the user's last log-out). The listing of comments may be scrollable, e.g., by a finger swipe on touch screens or by using a scroll bar 375 and/or mouse.

According to some embodiments, the front page 300 or a discussion page 400 may include active text or a button that, when selected, results in a compressed display of comments. The compressed display may comprise a list (e.g., a chronological or reverse-chronological list) of single-line entries for each comment. An entry in the list may identify a participant, a discussion topic, a date/time of posting, and an excerpt of the posted content. The compressed display may appear like a conventional email list. The compressed list may reflect comments included in a currently user-selected mode of display (e.g., displaying all comments for all discussion topics, displaying all comments for a particular discussion topic, or displaying all comments for a particular sub-discussion topic.) The compressed display of comments may provide an overview or timeline of comments recently posted.

The front page may further include an interactive search window 360, 361, 362 that may include one or more active buttons. A field button 361 may be recognized by the system, when selected, to allow a user to select a search field, e.g., within all discussion topics, within a particular discussion topic, within a date range for all discussion topics or a particular discussion topic, within a comment or comments, within attached content to a particular discussion topic, etc. A keyword entry window 360 may be configured to receive user input keywords or phrases, including Boolean operators. A search button or icon 362 may be used to initiate execution of a search using the defined field and entered search terms. The discussion topic system may include a search engine, locally or on a discussion-topic server, configured to recognize search parameters entered by a user and return results relevant (e.g., having some degree of matching) to the search parameters.

In various embodiments, targeted searching of discussion data structures can be performed using interactive search windows in the discussion-topic system. Search terms and phrases that may be entered by a user and recognized and used by the system to search through discussion data structures include any combination of: keywords or phrases that may occur in posted comments, a participant identifier (e.g., "@andrew") that may limit search results to comments and/or discussion topics associated with that participant, a discussion identifier to limit search results to a particular discussion topic, a tag (e.g., "#luxurycar") to limit search results to discussion topics and/or comments that have been tagged with the particular tag, and condition(s) on one or more active tags. In some implementations, searching may be executed locally at a user's device, e.g., by searching discussion data structures that are maintained and updated locally. In some implementations, search queries may be forwarded to a discussion-topic server which may execute search in conjunction with network data nodes that may store discussion data structures.

In some embodiments, the restriction of searching to a particular discussion topic may be indicated in a search term by adding one or more special characters to the search term. For example, prepending "&" to a search term "family_reunion" to form "&family_reunion" may restrict the search to only a discussion data structure associated with the particular discussion topic identified as "family_reunion". Prepending "&&" may restrict a search to an active tag. Prepending "#" may restrict a search to a particular descriptive tag. In some implementations, a special character, or characters, may be used to restrict a search to replies made in response to a particular comment posted within a discussion topic, e.g., "r&" followed by a comment identifier. Other special characters may be used instead of, or in addition to, the special characters described. In some embodiments, a same special character may be used for two purposes. For example, the number sign "#" may be used for both identifying descriptive tags and for identifying active tags in some implementations. A search prepending "#" may then return results for both descriptive tags and active tags meeting the terms of the search.

In some embodiments, searches directed to active tags may include operators that may define constraints on active tag arguments. As one example, at least one active tag may be defined as "#due_date(9/2/2014)". A search string may impose a constraint on arguments so as to return active tags and/or discussion topics within a range specified by the imposed constraint. For example, a search string may include "#due_date <=9/5/2014" or "#due_date (<=9/5/2014)" to return a list of all discussion topics and/or active tags having "due_date" active tags with an action item due on or before Sep. 5, 2014. As an additional example, one or more active tags may be defined as "#assigned_to(@mary)" for one or more discussion topics. A search string may comprise "#assigned_to =@mary" or "#assigned_to(@mary)" and return a list of all discussion topics having "assigned_to (@mary)" active tags. In some embodiments, a discussion-topic server or user device may be configured to interpret an expression in an argument of an active tag when the active tag is included in a search string. For example, a discussion-topic server or user device may analyze the expression "<=9/5/2014" that appears within parentheses in the above example to determine a range of dates satisfying the search query. Active tags may be included in more complex search strings, e.g., strings containing Boolean expressions.

As may be appreciated, the example front page 300 described above is only one embodiment of potentially many embodiments that may contain more or fewer features and elements than those shown in FIG. 3A. Additionally, the features and elements may or may not appear as arranged in FIG. 3A. The example graphical user interfaces described above and below are intended for teaching purposes, and are not intended to be limiting in any way.

FIG. 4A depicts a "discussion page" that may be displayed on a user's device, according to some embodiments. A discussion page 400 may be used by a user for interactive tasks that are directed to a particular discussion topic. The discussion page 400 may include a menu bar 401, which may be substantially the same as a menu bar 301 for the front page, or may be different from the front page menu bar. The discussion page may also include a main discussion window 402, which may share some interactive panels with the front page, e.g., an interactive search window. The main discussion window 402 may include a content information portion 480 that may, in some embodiments, provide listings of content relating to the discussion topic identified (e.g., identified as text or in a discussion-topic summary panel 410) on the discussion page. The listing of content may be displayed in user-selectable formats. The main discussion window 402 may also include a plurality of panels or windows, some of which may be interactive, that contain information about the discussion topic, e.g., a discussion identifier panel 410, a brief description panel 420, a participant sharing panel 430, a tagging panel 440, an active tag panel 450, a sub-discussion panel 460, and a super-discussion panel 470. A user's device may be configured to provide additional information or functionality for any of the panels upon a mouse-over and/or clicking on a panel.

According to some embodiments, a user's device may navigate to a discussion page responsive to a user clicking on a comment 370-n on the front page. A user's device may be configured to display a distinct discussion page for each discussion topic in which the user participates. A discussion page for a particular discussion topic may be selected by the user from the front page 300, e.g., by clicking on a listed comment 370-n. In some embodiments, a discussion page may be selectable from any page by selecting a discussion topic from a drop-down menu item or a discussion icon in the main window that pops up a user-selectable listing of discussion topics. In some implementations, a menu item or icon, when selected, may pop up a text entry window in which a user may enter a discussion topic to navigate to the corresponding discussion page.

A discussion-topic summary panel 410 may provide a short summary of data relevant to the discussion topic. In addition to a discussion-topic identifier ("BMC_litigation@decker" in the illustrated example), the summary panel may include a total number of comments posted for the discussion topic, a date the discussion topic was created, and information about member and follower privileges. In some embodiments, the summary panel may further include information about content attached to comments, e.g., number of working documents, number of images, dates when working documents were created and/or last revised, number of revisions, etc.

According to some embodiments, discussion topics and/or comments may receive priority rankings (e.g., highest, high, normal, trivial, etc.) by a participant. Priority rankings may be displayed in the discussion-topic summary panel 410, in some implementations. In some embodiments, discussion topics may receive a status indicator (e.g., invalid, new, unconfirmed, reopened, ready, resolved, verified, wontfix, duplicate, etc.) defined by a participant. A status indicator may be created as an active tag (e.g., "#statusQ") for which the argument identifies the status. Status indicators and/or tags may be displayed in the discussion-topic summary panel 410, in some implementations, or elsewhere on the discussion page in some embodiments.

In some embodiments, the discussion page may further include a discussion description panel 420, that may be a brief description about the discussion topic. Text for the discussion description panel 420 may be composed and entered into a user's device (e.g., via the discussion-creation graphical interface 380) when the user creates the discussion topic.

The discussion page 400 may further include an interactive participant window 430. The interactive participant window may be configured to receive participant identifiers (e.g., @alex, @bethany, . . . ) input by a user, so as to identify participants permitted access to the associated discussion data structure. In some embodiments, the participant identifiers may be entered into separate data entry windows that are configured to receive either member participants or follower participants or to specify access privileges for the identified participants. In some implementations, a single data entry window may be configured to receive participant identifiers and a participant designation (e.g., "m" for member, "f" for follower). The discussion-topic system may maintain a record of participants and their associated access privileges for each discussion topic. A discussion-topic server may consult this list to determine access privileges for participants requesting discussion content associated with a discussion topic. After entry of participant identifiers, the participant identifiers may be displayed in association with participant designation.

The discussion page 400 may also include an interactive tagging window 440. A tagging window may be configured to receive and display user-defined tags associated with the discussion topic and its corresponding discussion data structure. For example, descriptive tags or active tags pertinent to a discussion topic may be entered via the tagging window 440. Entry of a descriptive tag or active tag may cause the system to associate the descriptive tag or active tag with a discussion data structure for the discussion topic. In some embodiments, entered tags may populate tag fields in a discussion data structure. In some implementations, entered tags may be added to metadata for a discussion data structure. A descriptive tag may be defined by a user according to a standardized or commonly recognized naming convention, e.g., the symbol "#" followed by an alphanumeric string, according to some embodiments. In other embodiments, another symbol or multiple symbols may be used to define a descriptive tag. Descriptive tags may be used by the system for searching discussion data structures. For example, hashtags may be entered as search terms in search queries via an interactive search window 360. After entry of one or more hashtags, at least one of the hashtags may be displayed in the interactive tagging window 440 at all times, until the hashtag is deleted from the discussion topic. In some embodiments, certain participants, designated by an administrator, may be given permission to delete descriptive tags and/or active tags from a discussion topic.

According to some embodiments, a discussion page 400 may include a separate active tag window 450, that may display one or more active tags associated with the discussion topic. In some implementations, the active tag window 450 may be configured to receive user entries defining active tags, and/or may include an active icon or text that, when selected, pop-up an active tag creation window 501, as depicted in FIG. 5A for example. In some implementations, descriptive tags and active tags may be displayed in a single tag window rather than separate windows.

A discussion page 400 may also include listings of sub-discussion topics in a sub-discussion panel 460 and super-discussion topics in a super-discussion panel 470 associated with the discussion topic identified in the discussion-topic summary panel 410. According to some embodiments, the listed sub- and super-discussion-topic identifiers may be active, such that when one or more of the entries is selected by a user the user's device diplays a corresponding list of discussion content (e.g., a list of comments, a list of attached content) for the selected topic or topics.

In some implementations, a discussion page may include a chat window 490 and/or an icon or text to initiate a chat window. A chat window may be used by a user to initiate a network chat session with one or more participants in the discussion topic. The chat window may indicate which participants are currently on line, and be configured to receive user input to invite one or more participants into a chat session. According to some embodiments, messages transmitted in a chat session may be posted automatically as comments under a currently-selected discussion topic. In some embodiments, an initiator of a chat session may select whether the subsequent chat messages will or will not be posted automatically as comments under a currently-selected discussion topic.

As mentioned above, the discussion page 400 may include a content information portion 480. This portion of the discussion page may provide at least one listing of discussion content associated with a selected discussion topic. A displayed listing may be scrollable, e.g., via a finger swipe on a touch screen, a scroll bar and/or mouse. According to some embodiments, a first content listing may comprise a list of recent comments posted by participants. Each item listed may include a combination of a participant identifier, identifying who posted the comment, a date and/or time as to when the comment was posted, alphanumeric text of the comment, an indication of attachments if any. In some implementations, each listed item may include an identifier indicating to which discussion topic, sub-discussion topic, and/or super-discussion topic the comment belongs. A list may be arranged in a user-selectable order. Examples of listing orders selectable by a user may include, chronological, reverse chronological, alphabetical by participant identifier, etc.

In some embodiments, the content information portion 480 may include user-selectable views of content associated with a discussion topic. For example, a first user-selectable view may comprise a full-screen listing of comments, as described above. A second user-selectable view (e.g., an image view) may comprise a full-screen listing of images (e.g., an ordered display of photos or thumbnails of photos) attached to comments. A third user-selectable view (e.g., a file view) may comprise a full-screen listing of files or documents (e.g., active file icons) attached to comments. Other views may include a video view, listing videos attached to comments, and an audio view, listing audio recordings attached to comments. The listings in each view may be according to a user-selectable order as described above.

The listing for each content view may provide a convenient display for reviewing a historical record of comments and attached content associated with a particular discussion topic (e.g., pertaining to a particular subject matter). For example, an image view may provide a scrollable listing showing thumbnails of images associated with a selected discussion topic, a participant identifier who sent the image, and/or a date the image was sent. A file view may provide a scrollable listing showing icons or thumbnails of files, a participant identifier who sent the file, and/or a date the file was sent. In some embodiments, an image of a first page or first portion of a first page of a file may be displayed in the listing. The user selectable views of discussion content provide a quick and convenient way for a user to search through attachments to files without viewing the associated text of a comment.

Figure 4B:
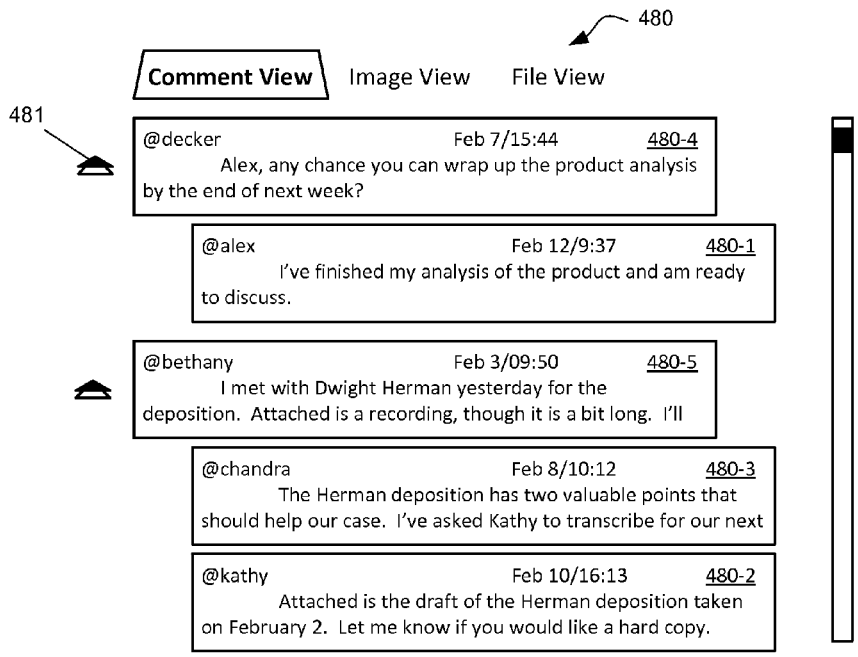
FIG. 4B depicts a hierarchical visual feed of initiating and reply comments associated with sub-discussion topics, according to some embodiments.

According to some embodiments, comments or listed content for a discussion topic may be organized and displayed hierarchically, and a user may select one or more groupings of discussion content within the hierarchy for display. As such, a user may arrange a comment view or comment feed (or image view or file view) in a preferred format that may be more informative and easily reviewed by the user. For example, in some embodiments, comments 480-1-480-n within a discussion topic may be organized in a two-level hierarchy, and presented to a user as depicted in FIG. 4B, so as to indicate, at a macroview, a distinction between two types of comments. The first level (initiating comments) may comprise initial posting of comments relevant to the discussion topic. The second level (replies) may comprise replies to the initial postings. For distinguishing hierarchical structure at a macroview, a user should be able to identify the distinguished hierarchical levels without reading fine print of text associated with an entry in the listed content. When displayed, the initiating comments may appear, at a macroview, different than the replies, e.g., offset (as depicted in FIG. 4B), different color, different font, different format, etc. The discussion-topic system may maintain a record of initiating comments and reply comments, so that the comments may be organized by a server or user's device into the two-level hierarchy. The two-level hierarchy provides an additional level of organization within a discussion topic that may allow one to readily identify different lines of thought developed within a discussion topic. The replies may be collapsed, or hidden, via an interactive collapse icon 481 that a user may activate. In some embodiments, a user may selectively delete initiating comments and/or replies.

Initiating and reply comments may be distinguished by the discussion-topic system at the time of their creation, according to some embodiments. For example, a discussion page 400 may include a first provision for posting an initiating comment for a selected discussion topic, and include a second provision for posting a reply to an initiating comment or other reply. In some embodiments, a discussion page may include a first icon 312 that may be used for posting an initiating comment for a currently-selected discussion topic. The discussion topic (e.g., parent or sub-discussion topic) may be selected using a discussion topic panel (e.g., sub-discussion panel 460, super-discussion panel 470, or a panel or list on the discussion page that displays and provides for selection of parent discussion topics and sub-discussion topics). In some embodiments, a discussion page may further include a second icon 412 that may be used to reply to a selected comment. In some implementations, a reply icon may be associated with each displayed comment. A user device or discussion-topic server may, upon receiving a posted comment, attach a comment identifier to the comment data indicating whether the comment is an initiating comment or a reply comment. According to some embodiments, a reply comment identifier may further identify the comment for which the reply was generated.

Figure 4C:
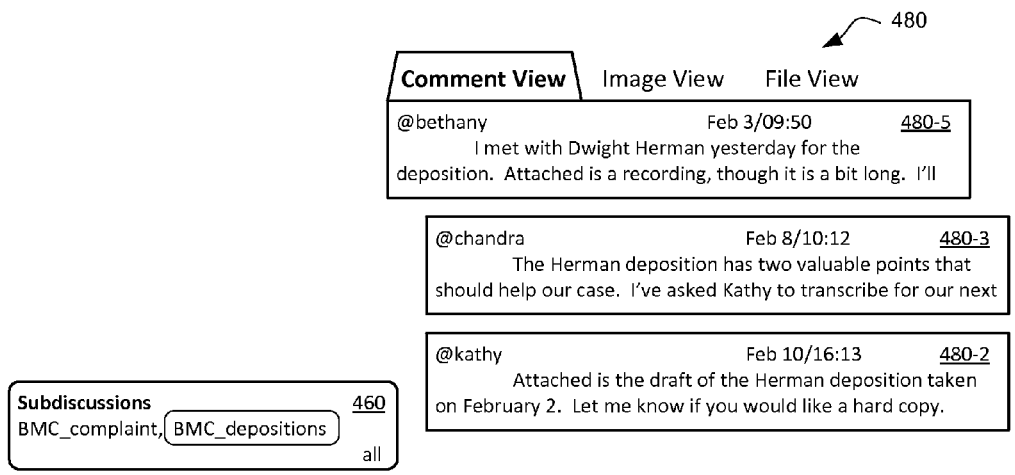
FIG. 4C depicts a hierarchical visual feed of initiating and reply comments associated with one sub-discussion topic, according to some embodiments.

In some embodiments, the listings of the content information portion 480 may be selectable by a user to include any content associated with a parent discussion topic, or only content associated with one or more sub-discussion topics. For example and referring to FIG. 4A, a user may select active text or an active button (e.g., the "all" text in the sub-discussion panel 460) to display a desired list or lists of discussion content associated with the selected discussion topics (parent and/or sub-discussion(s)) of the current discussion page. In FIG. 4A, all sub-discussions have been selected, and all content (comments, images, files) associated with the discussion topic appear in lists in the content information portion 480. As depicted in FIG. 4C, a user may select only one sub-discussion for display purposes. The selected content may be displayed as a full-screen listing for a user's convenience. Accordingly, substantially only the content associated with that sub-discussion will appear in lists in the content information portion 480. By narrowing the scope of subject matter and associated content displayed within a discussion topic, a user may more easily review and find relevant information for the particular subject matter. This can eliminate an aspect of conventional email where a user manually organizes individual email messages into folders and sub-folders created by the user, and later searches through folders and sub-folders to find the desired information. As depicted in FIG. 4C, the displayed sub-discussion content may further be organized hierarchically into initiating comments and replies, as described for FIG. 4B.

Lists of discussion content may be arranged as visual feeds in some embodiments. A visual feed may comprise an active list that may be updated in near real-time (e.g., within seconds or minutes for on-line users) as comments are posted to a discussion topic, and rendered as a visual display on a user's device. A visual feed may be arranged in reverse chronological order or in chronological order, according to some embodiments. Other arrangements may be implemented in other embodiments. A user's device may maintain a visual feed by receiving new discussion-content data associated with a discussion topic, identifying whether the received data is associated with a currently-displayed discussion topic, and rendering the new data in a currently-displayed list of discussion content for the discussion topic if it is determined that the received data is associated with the currently-displayed discussion topic.

According to some embodiments, a visual feed may be rendered as a "full-screen" listing of content associated with one or more selected discussion topics. The listing may be the only listing of content associated with the selected discussion topic or topics that is presented to the user on the display, and need not occupy the entire screen of a display. For example, responsive to a user selecting only a sub-discussion topic for viewing of content, only content associated with the selected sub-discussion topic may be rendered by the server or user's device in the listing presented to the user. Responsive to a user selecting two discussion topics for viewing of content, only content associated with the selected two discussion topics may be rendered by the server or user's device in the listing presented to the user.

FIG. 4D depicts a file lists 482 that may be displayed as a file view, according to some embodiments. When a file view is selected by a user, a user's device may display a list of files (e.g., a list of file icons and/or file names) associated with one or more discussion topics of a parent discussion topic. The listing of files may include creation date, creator, a last-modified date for each file in some embodiments. An image view may comprise a list of thumbnail images representative of image files associated with one or more discussion topics of a parent discussion topic. Like the comment lists, image and file lists may be arranged to indicate, at a macroview, a hierarchical structure.

FIGS. 5A-5D depict an example of a user interaction with an active tag creation window 501. A user's device may be configured to pop-up an active tag creation window 501 on a display responsive to a user selecting an active item (e.g., "add") or icon from, or clicking on, the active tag window 450 of the discussion page. The active tag creation window may comprise a convenient, visual, interactive, user interface that allows a user to flexibly create an active tag and its associated argument. Machine-readable instructions executing in connection with the active tag creation window 501 may include functionality for creating a new active tag or selecting from an existing list of active tags, and for creating an argument for the active tag or selecting and argument from existing arguments or data. The example shown in FIGS. 5A-5D is only one example, and is not intended to be limiting. In the discussion-topic system, a user may freely define an active tag and/or its argument. Additionally, a user may define more than one active tag and corresponding argument for a discussion topic. In some embodiments, more than one argument may be defined for an active tag.

In some embodiments, the active tag creation window 501 may comprise a naming portion 510 with which a name or identifier may be defined or selected for the active tag, and an argument type portion 520 with which an argument type for the active tag may be defined or selected. An active tag creation window may further include an argument identifier portion 525 configured to accept a user-entered or user-selected argument identifier. The argument identifier portion may not be displayed, in some embodiments, until an argument type has been received. The active tag creation window 501 may also include information 505 to indicate that a connection is being defined for a particular discussion topic.

The naming portion 510 may comprise a graphical user interface configured to accept user input. According to some embodiments, the naming portion 510 may be configured to receive alphanumeric data entered or selected by a user (e.g., the character string "assigned_to" composed by a user may be entered). The data entered or selected may be used by the system as an active tag name to identify a corresponding active tag data structure. The character string may be displayed as it is typed, as shown in FIG. 5B. In some embodiments, a special character or characters (e.g., "#", "&&", "#&", etc.) may be appended to the active tag name by the system to form an active tag identifier, e.g., "#assigned_to." In some implementations, a user may enter the tag with the special character. In some embodiments, the naming portion 510 may be configured to present a drop-down list of commonly-used active tag names (e.g., "due_date", "follow_up_by", "call_me_at", "conference_call", "meeting_at", "please_review", "urgent_response_needed", etc.). In some implementations, a user's device or discussion-topic server may be configured to maintain a log of active tag names used by the user, and provide a drop-down list of most-frequently-used active tag names and/or most-recently-used active tag names for a user to select. The drop-down list and selection may be executed by a mouseover, a mouse clicking action, and/or keystroke action.

The argument type portion 520 of the active tag creation window 501 may be configured to receive data identifying a type of argument, as depicted in FIG. 5B. According to some embodiments, a type of argument may be selected from a drop-down list. In other embodiments, a user may type in a type of argument. A type of argument may include, without being limited to, a data file, a discussion, a contact, a group, a date/time, a string, an executable script, and a URL or link to a web site. Additional or fewer argument types may be available in some embodiments. A data file argument type may identify any type and form of data or media file, e.g., a text document, an image, a video, an audio recording. A discussion argument type may identify a discussion data structure (e.g., a discussion identifier for a discussion data structure to which the user is a participant). A contact argument type may identify a contact known to the user. A group argument type may identify a group of contacts defined by the user. A date/time argument type may identify a date and/or time selected or entered by the user. A string argument type may identify an alpha-numeric string that is composed and entered or selected by the user. A URL argument type may identify a link to a web site or web page. An executable argument may include executable code that performs an operation on a participants device, for example, plays a video or audio clip, launches a voting or rating script.

In some embodiments, responsive to identification of an argument type, a user's device may be configured to provide selectable entries for defining the argument itself, or may provide an interactive window in which a user may enter information defining the argument. For example, if a user identifies a "contact" argument type, the user's device may be configured to present a drop-down list of the user's contacts from which the user may select (e.g., via a mouse operation or keying action) a particular contact. According to some embodiments, the drop-down list of contacts may be limited to contacts that are participants in a discussion topic for which the active tag and argument are being defined. Alternatively, the user may type in a contact identifier, and the system may verify whether the contact identifier is in an approved format and/or whether the identified contact is a participant in the discussion topic for which the active tag and argument are being defined. If a user identifies "string" as an argument type, the user's device may be configured to present a text-entry window and receive string data that is entered in the text-entry window. Once the active tag and argument are defined, a user may finalize the data by a confirming action, e.g., pressing an enter key or selecting a button such as "Create Smarttag" depicted in FIG. 5D.

For arguments that comprise larger amounts of data, e.g., more than about 10 kB, argument definitions may comprise links to the data, e.g., a file name and/or location at which a copy of the file may be obtained.

Regardless of how the active tag and argument are defined and entered, newly-created active tag data is received by the user's device in association with a discussion topic for which the active tag and argument were defined. A user's device may add the active tag data to the discussion data structure for the discussion topic. In some embodiments, the active tag data may be added as metadata to the discussion data structure. In some embodiments, the active tag data may be added into active tag fields for the discussion data structure. Alternatively or additionally, a user's device may transmit information about the newly-created active tag data to a discussion-topic server, so that the server may update its discussion data structure to include the newly-created active tag data. The information transmitted to the discussion-topic server may include the newly-created active tag data and an identifier for the discussion topic. Alternatively, a user's device may automatically transmit an action metadata message to the discussion-topic server indicating that it has an updated version of a discussion data structure. The server then may retrieve a copy of the data structure, or an active tag portion of the data structure, from the user's device.

According to some embodiments, the discussion-topic system may recognize different types of active tags, and associate specific executable code with the recognized tags. For example, an active tag defined as "#due_dateQ" may be recognized by the system as an active tag having a date argument. The system may associate executable "calendar" code with the active argument, e.g., provide a link to the calendar code. When a rendering of the active tag is selected by a user the system may launch the executable code to present a visually displayed interactive calendar to the user. The calendar may indicate the due date and may allow the user to change the due date by clicking on a different date displayed in the calendar. As another example, the system may recognize an "#assigned_to( )" active tag and associate a "reassignment" executable code with the active tag. When a rendering of the tag is selected, a user's device may provide a drop-down list of potential participants to which the tag may be reassigned.

According to some embodiments, active tags and descriptive tags may be defined to be somewhat similar in appearance. For example, both active tags and descriptive tags may be prefixed with a same symbol (e.g., "#"). However, unlike a descriptive tag, an active tag may be associated with an argument that may be visible to a user when an active tag is displayed. For example, a descriptive tag may appear as "#vacation_planning", whereas an active tag may appear as "#vacation_planning( )". The parentheses may indicate an active tag. In some embodiments, an argument may appear in the parentheses.

In various embodiments, a descriptive tag may be used for labeling content. For example, a descriptive tag may comprise a single string and may be added to metadata for a discussion topic. The string may be descriptive about content to which the descriptive tag is associated. An active tag, on the other hand, may be higher-order metadata that includes a name portion and an argument portion with associated functionality, in some embodiments. An active tag name may be representative of a predicate, and an associated argument may comprise an object of the predicate. For example, an active tag "#due_date" associated with a document that needs to be completed by an individual may include an argument that specifies a date on which the completed document is due. Additionally, when the active tag is presented to a user by the discussion-topic system, it may be rendered as an active button or active text. For example, when the user clicks on or selects the "#due_date" active tag, the user's device may initiate a program routine to display a calendar that the user may use to change the due date and/or display an active icon of the document that needs completion by the user and that initiates opening of the document when selected. In this regard, an active tag may provide a functional connection between the defined predicate and object. Other examples of active tags are possible. In another example, an active tag associated with a first discussion topic may include an argument that identifies a second discussion topic. When selected by a user, a visual feed of content may be changed from the first discussion topic to the second discussion topic, for example. In this regard, an active tag may be used to link discussion topics. In another example, an active tag that includes a URL link as an argument may, when selected, navigate to a web page identified in the URL link. An active tag that includes a script or pointer to executable code as an argument may, when selected, execute the script or code.

Information or data to be added to a discussion data structure (e.g., newly-created active tags, comments, tags, files, images, discussion topics, etc.) may be propagated through the discussion-topic system in a one or more different ways. In a system in which a discussion-topic server 140 manages discussion data structures and relational data structures for discussion-topic hierarchies, any new discussion content may be sent to the discussion-topic server, or an associated network data node for the server, for indefinite storage and subsequent retrieval by user devices. Therefore, user devices may retrieve discussion content from the cloud at any time.

In some embodiments, an originator of the new data may update its discussion data structure for a discussion topic and forward a copy of updated discussion data structure to a discussion-topic server and/or discussion-topic data node. The server may attend to dissemination of the updated discussion data structure. In some embodiments, an originator of the new data may update its discussion data structure for a discussion topic and forward only a portion of the discussion data structure (e.g., the portion added or updated) to a discussion-topic server and/or discussion-topic data node. In some embodiments, an originator of the new data may update its discussion data structure for a discussion topic and forward the updated data structure or a portion thereof to participants in the discussion topic and to a discussion-topic server and/or discussion-topic data node.

According to some embodiments, an originator of the new data may update its discussion data structure for a discussion topic and forward an action metadata message to any one or combination of participants, a discussion-topic server, and a discussion-topic data node. The action metadata message may provide a notification to the recipient that an updated or newly-created discussion data structure is available for retrieval by the recipient. The action metadata message may indicate where one or more copies of the discussion data structure can be retrieved by the recipient.

IV. Methods

FIGS. 6A-6D are flow charts describing some acts of operation of a user's device in connection with display of a discussion page, creation of an active tag, and creation of a discussion topic, according to some embodiments. Any suitable programming language (e.g., Java, C, C++, Javascript, Perl, etc.) that is supported by a processing device (e.g., a user's device and/or a discussion-topic server may be used to adapt the processing device to execute some or all of the acts and related functionality associated with the methods depicted in FIGS. 6A-6D or described above in connection with FIGS. 3-5. All, some, or additional acts may be executed by a user's device and/or a discussion-topic server adapted to support discussion-topic networking. In some embodiments where a discussion-topic server provides services and discussion-topic functionality and a user's device accesses the services and functionality via a web browser, a discussion-topic server 140 may execute some, all, and/or additional acts described in FIGS. 6A-6D. In distributed computing environments, such as that depicted in FIG. 1B where a user's device may be adapted with machine readable instructions so as to provide discussion-topic functionality on-line or off-line, the user's device may execute some, all, and/or additional acts described in FIGS. 6A-6D. The location at which certain acts are executed may depend upon the computing environment in which discussion-topic, content sharing is implemented. Although the description of method embodiments associated with FIGS. 6A-6D are written from the perspective of a distributed computing environment, it will be appreciated by one skilled in the art that corresponding acts may be performed in part or in whole by a discussion-topic server 140 in other embodiments. For example, with respect to displaying data at a user's device, a discussion-topic server 140 may receive a request from the user's device for the data, execute any necessary and associated acts to obtain the data, and transmit the data for display at a user's device. If the data includes a format for an interactive display at the user's device, the discussion-topic server may await receipt of, and receive, data entered by the user.

According to some embodiments, a user's device that has been adapted to operate as a participant of a discussion-topic group may be configured to test for receipt 602 of a command to display a discussion page. Responsive to receiving the command, the user's device may display 605 a discussion page 400 similar to that shown in FIG. 4A. In some embodiments, the command may be issued from a front page 300, for example, as described above in connection with the front page depicted in FIG. 3A.

According to some embodiments, a user's device may be configured to display 610 a listing of recent comments when displaying the discussion page. The displayed listing of comments may all pertain to the discussion topic associated with the discussion page, and may be organized into initiating comments and replies to initiating comments that are visibly distinguished at a macroview. While in operation, a user's device may test for receipt 612 of a new comment. If a new comment has not been received, the device may continue testing for receipt 612 of a new comment. If a new comment has been received, the device may determine whether the comment is identified as being associated with the currently-presented discussion topic. If the comment is identified as being associated with the currently-presented discussion topic, the user's device may update 613 the displayed listing of comments on the discussion page to show the newly-received comment.

For a newly-received comment, a user's device may further determine 614 whether the origin of the comment is local, e.g., entered by the user, or whether it was received over the network from another device. If the comment's origin is not local, the user's device may update 619 its local discussion data structure to include at least a portion of the data associated with the newly-received comment. Comment data may include data for the comment itself, metadata (e.g., time of creation, author, date, encoding, length, format, tags, etc.), attachments, and web links. The user's device may then return to awaiting receipt 612 of a new comment.

If the comment's origin is local, e.g., entered by the user, then the user's device may initiate 617 transmission of the comment and any related data to one or more participants in the discussion topic. According to some embodiments, initiation of transmission may comprise formatting all data into one or more data blocks containing at least a destination address, and transmitting the data to the at least one address. Transmission of data may be to a discussion-topic server and/or network data node in some embodiments. In some implementations, transmission of data may, alternatively or additionally, be to one or more participants in a discussion-topic group. In some implementations, initiating 617 transmission of the comment may comprise transmitting an action metadata message to at least a discussion-topic server, that may be configured to operate with content-sharing functionality of a content-share server described in U.S. Pat. No. 8,447,801. After transmission of an action metadata message, the user's device may provide the comment data responsive to receiving a request over the network from a data node or other user's device. Regardless of how the comment data is transmitted, the user's device may update 619 the local data structure for the corresponding discussion topic to include the newly-created comment, and then return to awaiting receipt 612 of a new comment. According to some embodiments, the updating 619 of the local discussion data structure and initiation 617 of transmission may be executed automatically by the user's device responsive to the receipt or final entry of the new comment data and/or determination of the comment's origin.

Figure 6A:
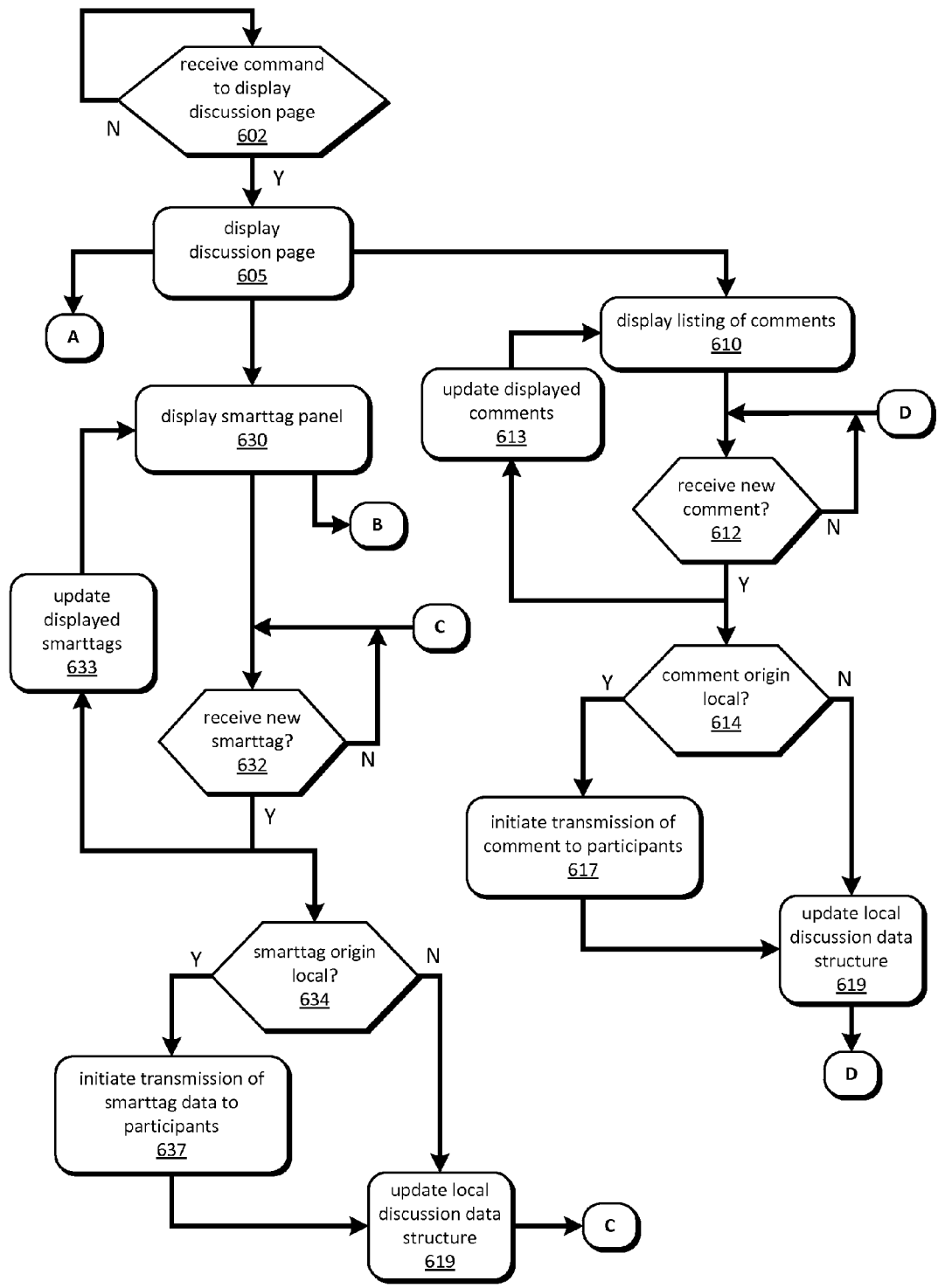
FIG. 6A depicts methods for displaying user interfaces relating to discussion topics, comments, active tags, and active tag arguments, according to some embodiments.
Figure 6B:
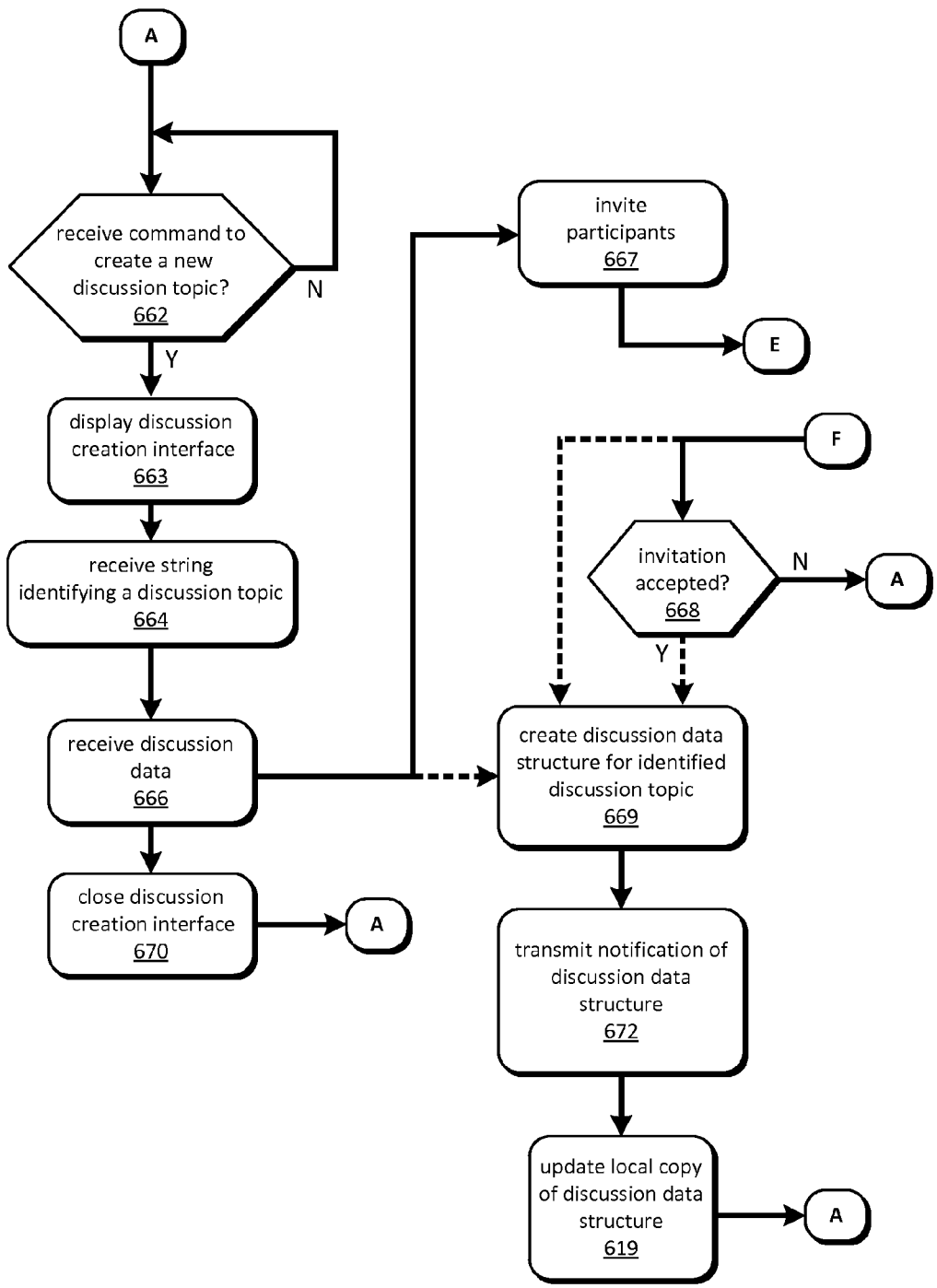
FIG. 6B depicts a method for displaying a user interface relating to creating a discussion data structure associated with a discussion topic, according to some embodiments.

As depicted in FIG. 6B, a user's device may be further configured to test for receipt 662 of a command to create a new discussion topic or display a discussion-topic creation interface, such as the discussion-topic creation interface 380 depicted in FIG. 3B. A command may be received when a user activates a button, e.g. the "new discussion" button 350 depicted in FIG. 3B. If a command is not received, the users device may return to awaiting receipt 662 of a command to display a discussion-topic creation interface. Responsive to receiving a command to display a discussion-topic creation interface, the user's device may display 663 an interactive discussion-topic creation interface. In some embodiments, using the interactive discussion-topic creation window, a user may enter data to define a new discussion topic, enter a comment or message for the discussion topic, attach content, identify participants for the discussion topic, and/or define whether the discussion topic is a sub-discussion topic or parent discussion topic of another discussion topic.

The user's device may receive 664 an alpha-numeric string, that may be entered via the discussion-topic creation interface, identifying a discussion topic. The alpha-numeric string, in whole or in part, may be used by multiple devices in the discussion-topic system to identify the discussion topic. In some embodiments, a user's device or a discussion-topic server may append additional data to the string so as to create a unique identifier for the discussion topic in the system. According to some embodiments, a user's device or a discussion-topic server may append an identifier for the user (e.g., user name or address) to the alpha-numeric string, so that participants can determine who originated the discussion topic. The user's device may also receive 666 additional discussion data associated with the identified discussion topic. The additional date may include, but not be limited to, identifiers for one or more participants that the user invites as members of the discussion-topic group, comment data, metadata, web links, and attachments. The user's device may then invite 667 participants in an invitation process, such as the process depicted in FIG. 6C, according to some embodiments.

The user's device, operating alone or in combination with another device such as a discussion-topic server, may create 669 a discussion data structure and associate the received alpha-numeric string identifier with the discussion data structure. The discussion data structure may be a multi-field data structure or record data structure of a standardized format across the discussion-topic system. According to some embodiments, creation of the discussion data structure may execute automatically at any point after receipt 662 of a command to create a new discussion topic. FIG. 6B depicts an embodiment where a discussion data structure may be created automatically after receipt 666 of discussion data. The drawings also depicts an embodiment in which creation of a discussion data structure is contingent upon acceptance of an invitation by at least one participant. For example, a participant's device may receive a notification about a newly-created discussion topic and present a notification to the participant, wherein the notification allows the user to accept the invitation or decline the invitation. Responsive to an acceptance or refusal by the participant, the participant's device may transmit an acceptance status message directed to the user who issued the invitation. According to some embodiments, the user's device may await receipt 668 of an acceptance status message indicating that at least one participant has accepted the invitation to join the discussion-topic group before creating 669 a corresponding discussion data structure.

In some embodiments, a user's device may await receipt 668 of an acceptance status message for a predetermined amount of time, e.g., one day, one week, a specified number of hours, that may be identified by the user. If the invitation has not been accepted after the predetermined amount of time, the user's device may notify the user and abort creation of a discussion data structure for the discussion topic, or execute steps to delete an already-created discussion data structure for the discussion topic that may be stored locally, and optionally at a discussion-topic server. In other embodiments, a user's device may not await receipt of an acceptance status message, and proceed directly to creating 669 a discussion data structure.

In some embodiments, a user's device may transmit 672 notification of a newly-created or modified discussion data structure to at least one other device, e.g., to at least a discussion-topic server. In some implementations, transmitting 672 transmission a notification of the discussion data structure may comprise transmitting an action metadata message to at least a discussion-topic server, that may be configured to operate with content-sharing functionality of a content-share server described in U.S. Pat. No. 8,447,801. After transmission of an action metadata message, the user's device may provide the discussion data structure responsive to receiving a request over the network from a data node, server, or other user's device. Regardless of how the discussion data structure is transmitted, the user's device may update 619 a local memory to include the newly-created discussion data structure. The user's device may return to awaiting receipt 622 of a command to create a new discussion topic.

Figure 6C:
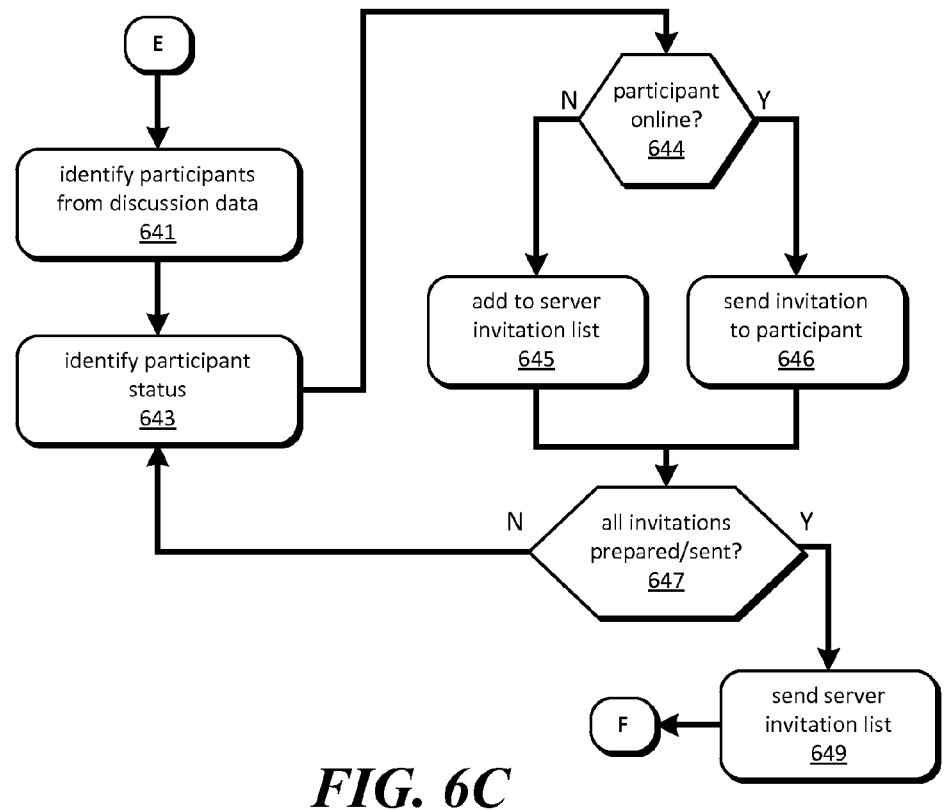
FIG. 6C depicts a method for inviting participants to be members of a discussion topic, according to some embodiments.

A discussion-topic server may also update its records to include information about the newly-created discussion topic. Among other things, a discussion-topic server may maintain a record of participants that are allowed access to the discussion topic, and a record of access privileges for those participants. Additionally, a discussion-topic server may maintain a relational data record that identifies whether the newly-created discussion topic is a sub-discussion topic of at least one other discussion topic and whether the newly-created discussion topic is a parent discussion topic of at least one other sub-discussion topic As depicted in FIG. 6C, an act of inviting participants to join in a discussion-topic group may comprise several acts executed by a user's device. In some embodiments, a user's device may identify 641 one or more participants from the received discussion data (from step 666) that may have been entered by the user. The user's device may then cycle through a loop, in some embodiments, to identify each participant invited to join in the discussion-topic group, and to provide invitations to each participant. According to some embodiments, a user's device may identify 643 a participant status (member, follower, etc.) for each invited participant from the discussion data entered by the user. A user's device may determine 644 whether an invited participant is online concurrently with the user. A prospective participant's on-line status may be monitored and identified by a discussion-topic server with which the user's device may be in communication. If it is determined that a prospective participant is on-line, the user's device may transmit 646 an invitation to the on-line participant, e.g., in a peer-to-peer protocol or via a discussion-topic server. If the participant is not on-line, the user's device may add identification information for the participant to a server invitation list that may subsequently be sent to a discussion-topic server or other intermediary device in the network, such as a message hold and forwarding service.

A user's device may then determine 647 whether invitation data for all the identified participants have either been prepared in a server invitation list or transmitted to the participants. If it is determined that invitation data for all the identified participants has not either been prepared in a server invitation list or transmitted to the participants, then the user's device may move to the next participant identified in the received discussion data and repeat acts as depicted in FIG. 6C. If all participants have been attended to, the user's device may transmit 649 the prepared server invitation list and await receipt 668 of at least one acceptance of an invitation, according to some embodiments. In other embodiments, a user's device may provide participant identifiers identified for a discussion topic to a discussion-topic server, which attends to inviting the participants.

Returning to FIG. 6A, when displaying 605 a discussion page, a user's device may display 630 an active tag panel 450, or a combined tag panel, that may include information about one or more active tags associated with the currently-presented discussion topic. The active tag panel may include active text or a button for creating a new active tag. While in operation, a user's device may await receipt 632 of new active tag data (e.g., data identifying an active tag, an argument, and a discussion topic with which the active tag is associated). The new active tag data may be received over the network from another device, e.g., another user's device or a discussion-topic server, in some embodiments. Responsive to receiving the new active tag data, a user's device may update 633, if the discussion topic is currently displayed, the displayed active tags listed in the active tag panel 450. If new active tag data is not received, the device may continue awaiting receipt 632 of new active tag data.

Figure 6D:
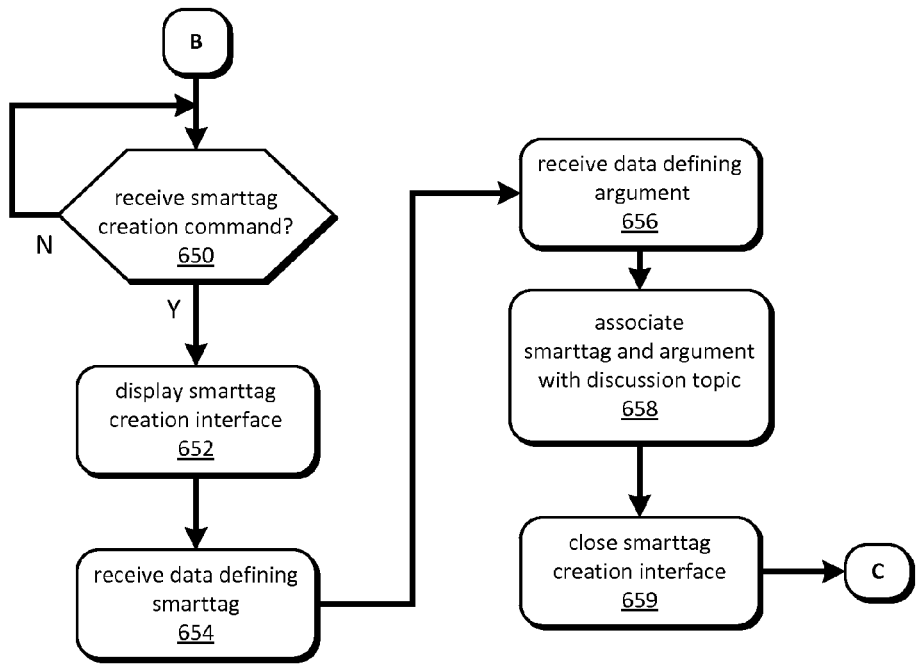
FIG. 6D depicts a method for creating an active tag, according to some embodiments.

With reference to FIG. 6D, in some embodiments, a user's device may await receipt 650 of an active tag creation command. For example, active text or a button in the active tag panel 450 may be activated by the user to issue a command to create a new active tag. Responsive to receiving the command to create a new active tag, the device may display 652 a user-interactive tag creation interface 501. A user may enter data via the active tag creation interface to define an active tag and an argument for the active tag. The user's device may receive 654 data that defines an active tag, and further receive 656 data defining an argument for the active tag. Responsive to receiving the active tag and argument data, a user's device may associate 658 the active tag and argument data with a discussion data structure for the currently-presented discussion topic (e.g., the discussion topic for which the currently-displayed discussion page corresponds). In associating the active tag data, the user's device may enter the active tag data in an active tag data field within the corresponding discussion data structure. According to some embodiments, a user's device may close 659 the active tag creation interface, and update 633 the displayed active tags to reflect the newly-created active tag on the discussion page.

Referring again to FIG. 6A, in some implementations, a user's device may determine 634 whether an active tag's origin is local, e.g., created by the user, or received from an external source. If the active tag's origin is not local, then the device may update 619 an internal record of active tag data for the discussion data structure. If the active tag's origin is local, the user's device may further initiate transmission 637 of the active tag and argument data to participants identified for the discussion topic and update 619 an internal record of active tag data for the discussion data structure.

In some embodiments, a user's device may be configured to await receipt of, and receive, tag data (e.g., hashtags) in a manner similar to that described above for active tag data. In some implementations, active tags may use a same prefix (#) as hashtags. In such embodiments, tags and active tags may be distinguished by the devices based on whether a hashtag expression is accompanied with an argument expression. For example, the string "#coastal_properties" may be classified as a hashtag by the discussion-topic system, whereas the expression "#assigned_to/Robert" or "#assigned_to(@bethany)" may be classified as an active tag. Any suitable delimiter or delimiters (e.g., back-slash, white space, parentheses, plus sign etc.) may be used to denote an argument and create an active tag.

As indicated above, a discussion-topic social-network system may include functionality for searching discussion data using active tags and active tag arguments. An example of search queries supported by the system are depicted in FIGS. 7A-7B, and are not intended to be limiting. As depicted in FIG. 7A, and interactive search window may present, responsive to a user's action, a drop-down list 710 that may be used by the system to limit the search domain and results. In the example shown, a user may select the search results to be limited to only those results that include a participant identifier "@person1". A user may enter, in a search query window 360, an expression containing an active tag "&&due_date" and an expression on an argument such as a date "<7/1/2013". After submission of the search query, a user's device and/or a discussion-topic server, may return a listing of search results that identify discussion topics accessible to the identified participant "@person1" and that include a "&&due_date" active tag having a date argument that precedes Jul. 1, 2013. According to some embodiments, the user's device or server may return a listing of corresponding posted comments or messages in which the active tag "&&due_date" first appeared for each discussion topic. The comments may be helpful in orienting the user as to what the active tag refers. In some embodiments, the user's device or server may return a listing of corresponding attached content (e.g., attached documents or files) that may have been associated with the active tag.

Various operators may be used in search query expression on some active tag arguments. The operators may include at least the following operators: less than "<", greater than ">", less than or equal to "<=", greater than or equal to ">=", or equal to "=". These operators may be used to specify constraints or ranges on active tag arguments. Boolean operators AND, OR, NOT, and exclusive or "XOR" may be used to combine multiple search expressions for one or more active tags and keywords, e.g., "#assigned_to(@bob AND #due_date(<=5/5/2014) OR urgent".

FIG. 7B depicts another example of a search query that includes an active tag. In this example, the search results are selected to be limited to data only from a particular discussion topic "discussion_id1". The search query specifies an active tag "&&assigned_to" and argument "@mary". According to some embodiments, responsive to receiving the search constraints, a user's device and/or a server may return search results that list only data (e.g., comments and/or attached content) from within the "discussion_id1" discussion topic relevant to the active tag "&&assigned_to" having an argument "@mary". The comments returned may be only those for which the active tag was first defined.

Figure 6E:
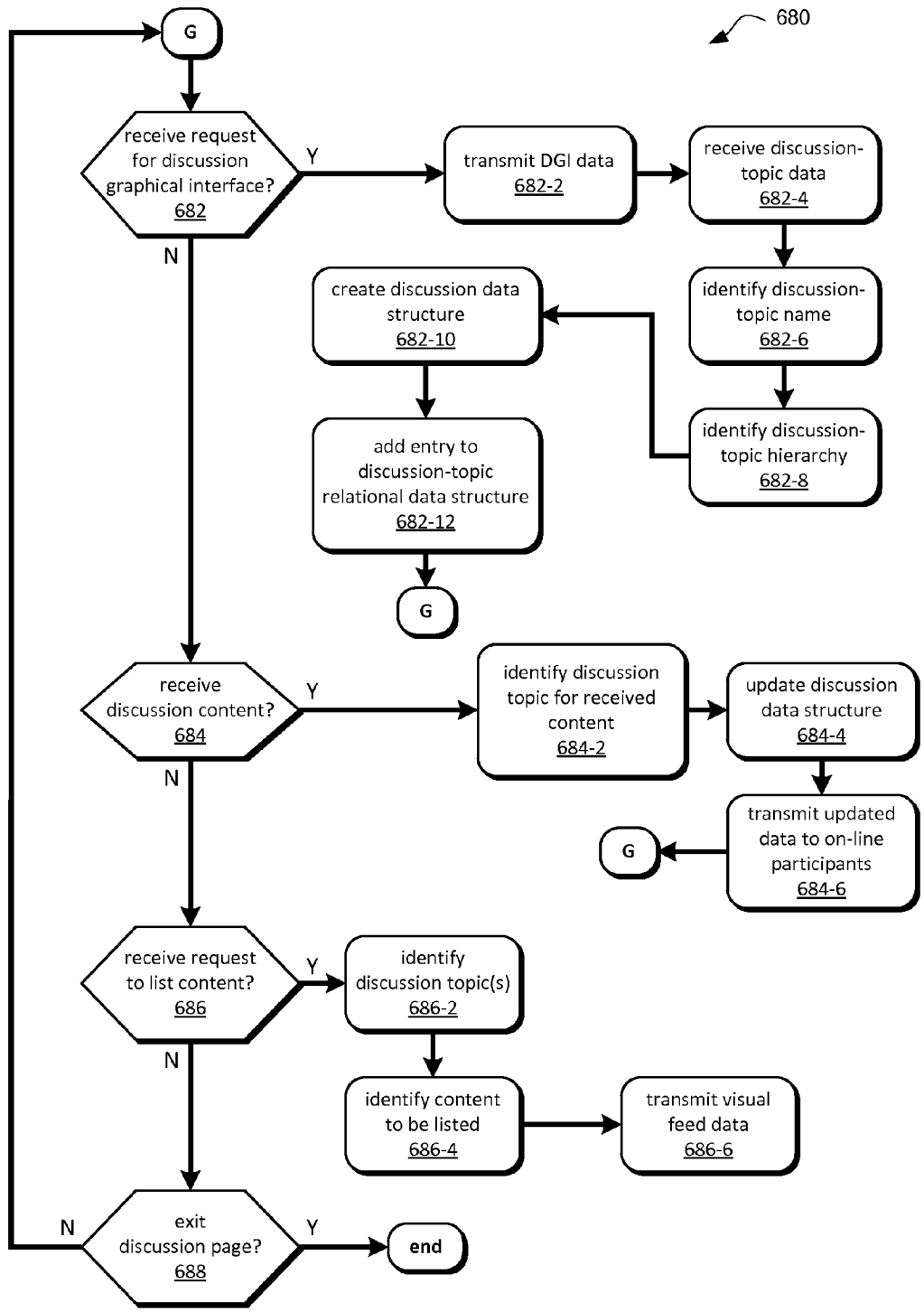
FIG. 6E depicts method steps that may be executed by a discussion-topic server in connection with creating a discussion topic and displaying content associated with the discussion topic, according to some embodiments.

FIG. 6E depicts one embodiment of a method 680 associated with hierarchical display of discussion content within a discussion page. The method may be used to produce a display like those shown in FIG. 4B or FIG. 4C at a user device. Method 680 may be implemented by a server in some embodiments, or may be implemented by a user device in some embodiments. When implemented by a discussion-topic server, the method 680 may comprise receiving 682 a request for a discussion graphical interface from a user device. The discussion graphical interface may be used to create a new discussion topic. Responsive to receiving the request, a discussion-topic server 140 may transmit 682-2 discussion graphical interface data to the user device that may be used to display, on a display of the user's device, a discussion graphical interface configured to receive user input for naming a discussion topic and for identifying the named discussion topic as a parent discussion topic or a sub-discussion topic of an existing parent discussion topic. A user may input discussion topic data via the discussion graphical interface, and the discussion-topic server may receive 682-4 the discussion-topic data. The discussion-topic server may identify 682-6 a discussion-topic name entered by the user, and may in some embodiments alter the name so as to generate a uniquely identifiable name for the discussion topic. The discussion-topic server may also identify 682-8 a hierarchical status for the discussion topic (e.g., sub-discussion topic, parent discussion topic). Some newly-created discussion topics may not be given a hierarchical status by a user, and may be left unassigned at the time of creation. These unassigned discussion topics may be later related hierarchically to other discussion topics. A discussion-topic server may further create 682-10 a discussion data structure for the discussion topic.

In various embodiments, a discussion-topic server may add 682-12 at least one entry that identifies a hierarchical status and/or relationship of the discussion topic in a relational data structure. In some embodiments, the relational data structure may be maintained by the discussion-topic server and may comprise a tabular data structure. Each entry may comprise a discussion-topic identifier, that may be used as an entry or index into the data record. Each discussion-topic identifier may be associated with a list of identifiers for sub-discussion topics that are related to the indexed discussion topic as sub topics. Each discussion-topic identifier may be further associated with a list of identifiers for parent discussion topics. The indexed discussion topic may be related to each of the parent discussion topics as a sub-topic thereof.

In some embodiments, though not shown in FIG. 6E, the discussion-topic server may receive one or more identifiers for participants for the discussion topic, and may transmit notifications to the participants so as to invite them to join in the discussion topic. The discussion-topic server may subsequently return to an earlier node (marked "G") in the method 680.

According to some embodiments, the server may receive 684 a plurality of discussion content from a plurality of sources. Discussion content may be received from users posting initiating comments or reply comments to discussion topic comments. In some implementations, content such as data files may be uploaded directly to a discussion topic. Received discussion content may be identified as associated with one or more discussion topics. For each received discussion content, a discussion-topic server may identify 684-2 a discussion topic to which the received content is associated. The discussion-topic server may review the received content and associated data (e.g., metadata) to locate a discussion-topic identifier that identifies the discussion topic to which the content is to be associated. The discussion-topic server may further update 684-4 a corresponding discussion-topic data structure to reflect addition of the content to the discussion topic. The updating may comprise adding the received content to the data structure, in some embodiments, or adding a pointer or other reference to the data structure that links the received content with the discussion data structure. In some embodiments, the discussion-topic server may transmit 684-6 updated data, reflecting the addition of the content, to participants that are currently on-line, so as to update their displays and/or data structures in near real-time. The discussion-topic server may subsequently return to an earlier node (marked "G") in the method 680.

In some embodiments, a discussion-topic server may receive 686 a request from a user to list content associated with a discussion topic. The request may identify one or more discussion topics within a discussion-topic hierarchy of parent and sub-discussion topics for which content is desired to be listed. From the user's request, the discussion-topic server may identify 686-2 the one or more topics for which content listings are requested, and may further identify 686-4 the type of content (e.g., comments, images, files) that is desired to be listed. Responsive to receiving from the user's device a request that identifies at least a parent discussion topic for display, the discussion-topic server may transmit 686-6 visual feed data to the user's device for displaying on the display of the user's device a first visual feed that includes at least a portion of discussion content identified as being associated with the parent discussion topic and at least a portion of discussion content identified as being associated with sub-discussion topics of the parent discussion topic. In some embodiments, the visual feed may comprise an intermixed list of content (e.g., listed in reverse-chronological order) of the selected content type. The listing may distinguish, at a macroview, between parent and sub-discussion topics. In other embodiments, a user request to list content for a parent discussion topic may result in transmittal 686-6 of only content associated with the parent discussion topic.

In some embodiments, responsive to receiving from the user's device a request that identifies one or more sub-discussion topics for display, the discussion-topic server may transmit 686-6 visual feed data to the user's device for displaying on the display of the user's device a second visual feed comprising at least a portion of discussion content identified as being associated with the one or more sub-discussion topics and not comprising discussion content that is not identified as being associated with the one or more sub-discussion topics. In this manner, a user may restrict views to selected subject matter within a discussion-topic hierarchy.

As depicted in FIG. 6E a discussion-topic server may receive a notification from a user's device to exit a discussion page 400. Responsive to receiving a notification to exit a discussion page, a server may end processing associated with the discussion page. If no notification is received to exit the discussion page, the server may return to an earlier node (marked "G") in the method 680.

In various embodiments, the discussion-topic system is cross-compatible with conventional email services. In some embodiments, a discussion-topic server or a user's devices may be configured to convert email chain messages into a discussion topic. FIG. 8A shows an example of an email chain message 800 that may be converted to a discussion-topic data structure. An email chain message may be an email message received at a user's device, using conventional email services, that includes a chain of reply and/or forwarded messages 860-$n$, and that may have been distributed to a number of entities that are listed in the address lines 810, 820, 840, 850 of the message. The body of the email message may contain a history of earlier messages (message2, message1).

A user receiving a chain email message using a conventional email service may wish to convert the message into a discussion-topic format for use on the discussion-topic system. A conversion may be executed by the user's device or a discussion-topic server, in some embodiments. A user may initiate conversion when responding to an email message by including in one of the address lines a discussion-topic inbox address for the user ("@fred" in the example shown). Alternatively, a user may simply forward the latest email in the chain to the discussion-topic inbox address. According to some embodiments, each user of the discussion-topic system may receive a general inbox email address associated with the respective user's accounts on the discussion-topic system. In some embodiments, each discussion topic may be given a specific email address (e.g., "family_reunion_2014_fred@dt.com"), to which information that is desired to be added to the discussion topic may be sent using conventional email services. When the user sends the chain message to the user's general email inbox, a copy of the message will be received by an email processor at the user's device or a discussion-topic server, processed by the email processor, and converted into a discussion-topic data structure, or into a format that can be added to an existing discussion-topic data structure, for use by the discussion-topic system.

Figure 8B:
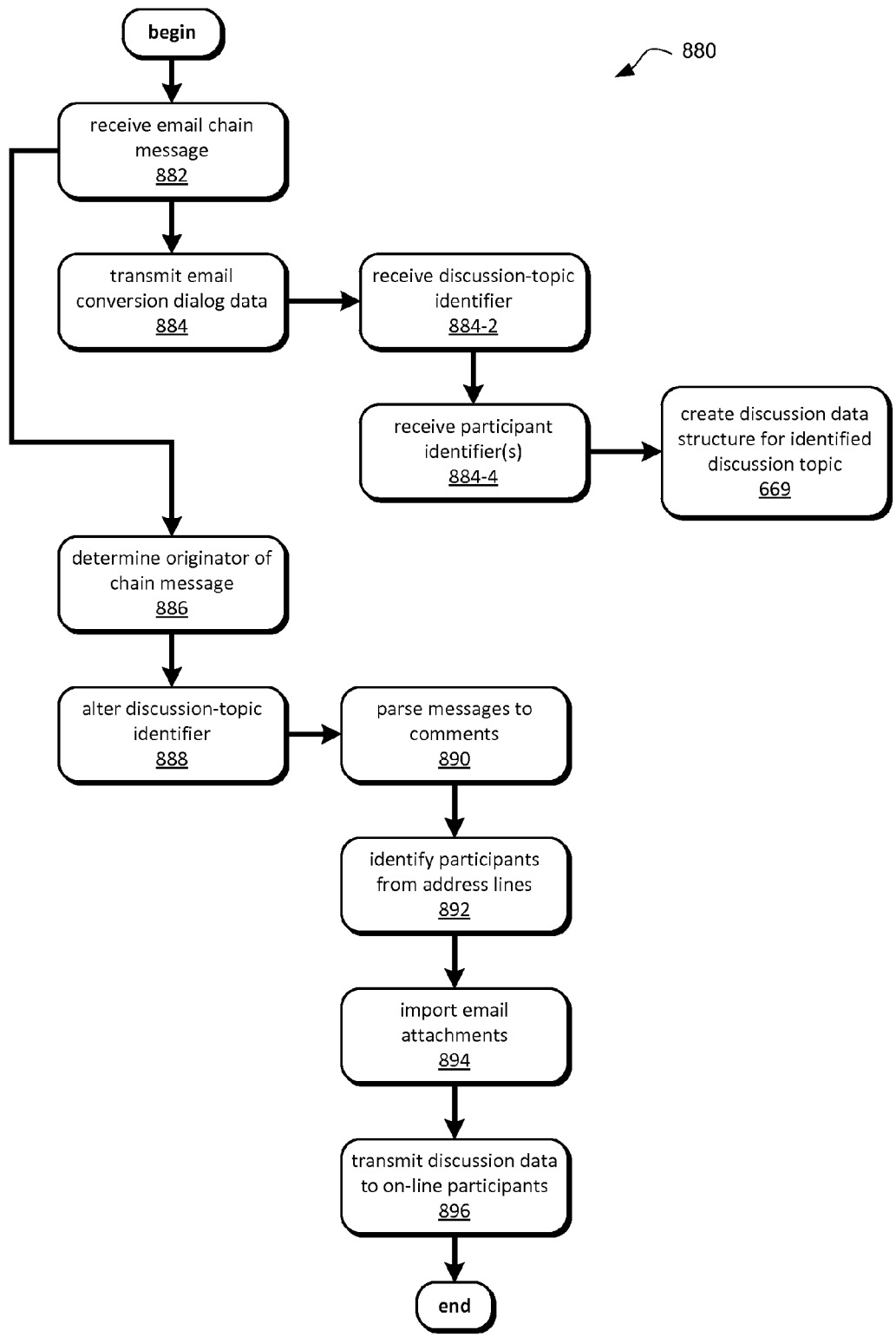
FIG. 8B depicts an embodiment of a method for converting conventional email for use in a discussion-topic system.

FIG. 8B depicts a method 880 that may be executed by a discussion-topic server 140 when converting conventional email into a discussion data structure for a discussion-topic system, in some implementations. In other embodiments, some or all of the acts may be executed by a user's device in a distributed computing environment, such as that depicted in FIG. 1B. In some implementations, after an email or chain email message is forwarded to a user's account (e.g., addressed to an email inbox for the user on the discussion-topic system), the discussion-topic server may receive 882 the email chain message and transmit 884 to the user dialog data for displaying an email conversion dialog window at the user's device. The dialog window may present email conversion options to the user. For example, the dialog window may allow the user to name the newly-created discussion data structure, or to copy or automatically import the existing subject line text as the name for the discussion data structure. The dialog window may include an interactive panel that allows the user to identify participants and participant status for the newly-created discussion data structure. The dialog window for converting email may also provide options for importing attachments associated with email messages (e.g., import, not import, rename, etc.), and for specifying whether the email is a sub-topic or parent topic of at least one other discussion topic. The discussion-topic server may receive 884-3 a discussion-topic identifier for the email chain message, and may receive 884-4 at least one participant identifier for one or more participants that are to be invited to participate in the discussion topic. According to some embodiments, a discussion-topic server may create 669 a discussion data structure for the discussion-topic identifier.

Subsequently or in parallel, the discussion-topic server, or an agent thereof, may review the messages within the received chain message to determine 886 the entity that originated the first email message (message1) in the chain, and append or otherwise alter 888 the discussion-topic identifier to reflect the originator's identifier. For example, if entity2 originated the first email message in the chain, the email processor may append "@entity2" to the discussion-topic identifier for the discussion topic. The discussion-topic server may then parse 890 each message from the message body as individual comments 480-n for the discussion topic, and associate data representative of the parsed messages as discussion content for the discussion topic. The discussion-topic server or user device may identify and associate a sender of each parsed message with the corresponding comment.

According to some embodiments, a discussion-topic server may review the address lines of messages to identify 892 participants for the discussion topic. Addresses appearing in the "To" line may be imported as member participants. Addresses appearing in the "CC" and/or "BCC" lines may be imported as follower participants. In some embodiments, addresses appearing in the "CC" line may be imported as member participants. In some implementations, an originator of the first email message may be imported as an administrator of the discussion topic. The discussion-topic system may be configured such that the administrator may select whether or not to include participants imported from the "CC" line as members or followers.

A discussion-topic server 140 may further review emails for attachments. Attachments, or references to the attachments, may be imported 894 as attached content for corresponding comments in the discussion topic. In some embodiments, earlier email messages may include only a file name as an attachment, but not the actual document. The discussion-topic server may be configured to search a user's device or a discussion-topic data node to locate a corresponding content of the same file name, and include a link in the discussion data structure for the discussion topic to the located content. The discussion-topic server may transmit data associated with the newly-created discussion topic to participants that are currently on-line, and later transmit the data to participants that come on-line at a later time. Once an email message or chain message is converted, participants may post comments to and receive postings and data for the newly-created discussion topic and access the contents of the corresponding data structure as they would for other discussion topics. The discussion-topic server may then end email conversion processing 880.

According to some embodiments, a user, via an email conversion dialog, may specify the email chain message to be a sub-discussion topic or a parent discussion topic of another discussion topic. The discussion-topic server may further identify the hierarchical status of the email chain message, as specified by the user, and update a relational data structure that identifies hierarchical relations (parent discussion topic/sub-discussion topic) between the newly-created discussion topic for the email chain message and at least one other discussion topic identified by the user.

According to some embodiments, conversion from email to discussion topic by the discussion-topic system may be two-way. For example, a user may select settings in the system to convert discussion-topic comments to outgoing email for some participants and discussion-topic data for other participants. This may allow a user to process all email messages using the discussion-topic system, while retaining email compatibility for participants that may not use the discussion-topic system. Conversion of discussion-topic data to email may be executed by an email processor of the user's device or at a discussion-topic server in a manner that is reverse to that described above for converting incoming email to discussion-topic data.

To assist with conversion from discussion topic to email, each discussion data structure in the discussion-topic system may have an unique, discussion-topic email address (e.g., "family_vacation@francis.dt.com"). The discussion-topic email address may be attached to outgoing discussion-topic data that has been converted to conventional email, so that a recipient may recognize the source of the email message, and may respond to the message. In some embodiments, a comment posted to a discussion-topic may be converted to an email and sent to one or more participants in the discussion topic.

In some embodiments, a user of the discussion-topic networking system may elect to receive email notifications at a conventional email account of the user for one or more discussion topics. When a user elects to receive email notifications, the user's device or a discussion-topic server will send an email message, bearing an identifier for the discussion topic, to the user for each posted comment in the one or more discussion topics. The user may review and reply to the email messages, whereupon the replies may be converted by a discussion-topic server for posting in the discussion-topic system. This may allow a user to maintain (via conventional email) activity in discussion topics from mobile devices or other devices that may not fully support discussion-topic system functionality.

Figure 9:
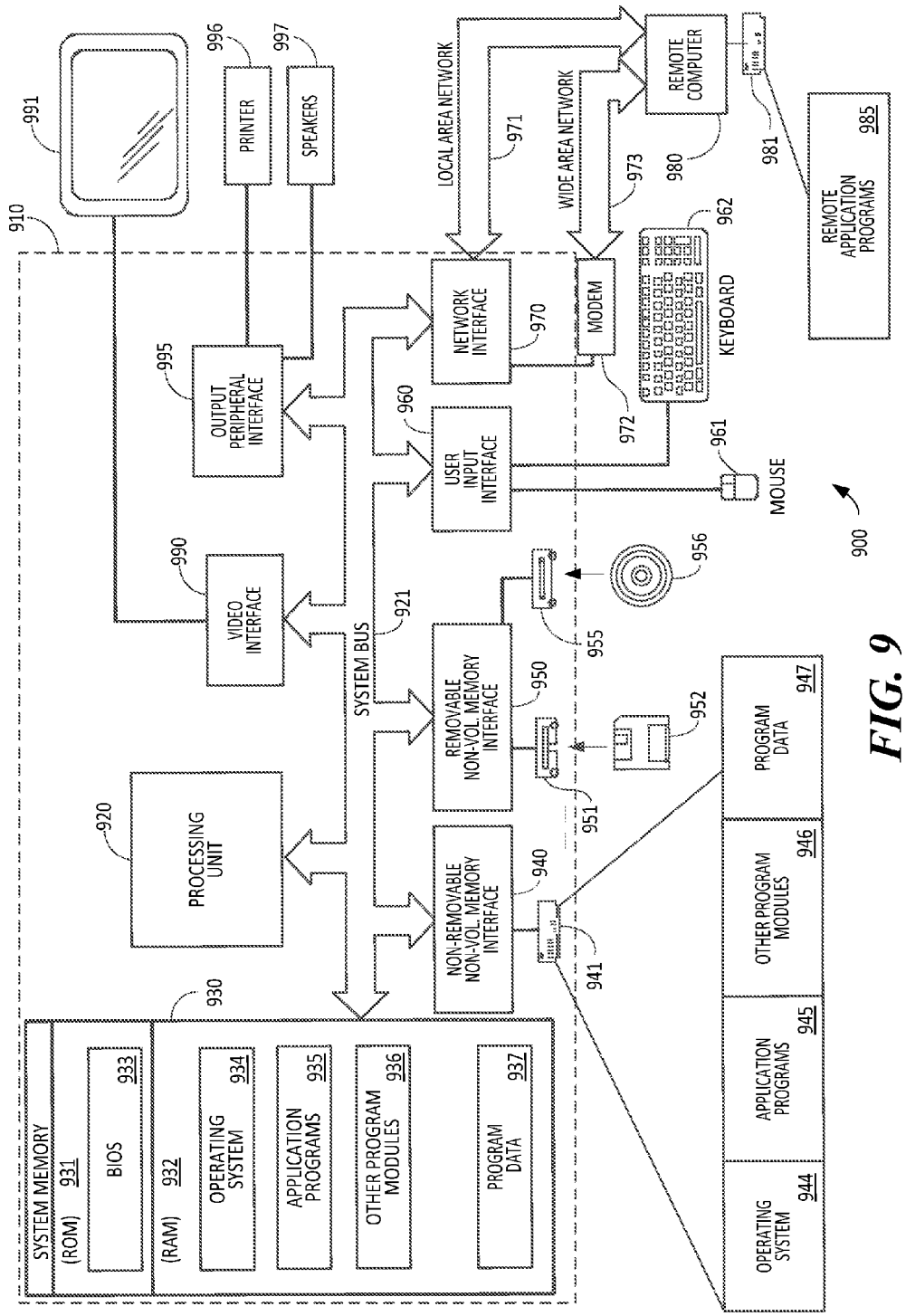
FIG. 9 depicts a further detailed diagram of components of a data-processing device that may be configured to execute discussion-topic, social network functionality, according to some embodiments.

FIG. 9 depicts, in further detail, components of a data-processing device that may be included, in whole or in part, in a device adapted for operation in a discussion-topic system. Some or all of the components shown may be present on a discussion-topic server or a user device, for example. In some embodiments, a device for implementing discussion-topic, networking functionality may include a computing device 910. Components of computing device 910 may include, but are not limited to, a processing unit 920, a memory 930, and a bus 921 that couples various components including the memory to the processing unit 920. The bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 may include one or more types of machine-readable media. Machine-readable media can be any available media that can be accessed by computer 910 and includes both volatile and nonvolatile, manufactured storage media, removable and non-removable manufactured storage media. By way of example, and not limitation, machine-readable media may comprise information such as computer-readable instructions, data structures, program modules or other data. Machine-readable media includes, but is not limited to, RAM, ROM, EEPROM, flash memory or other memory-device technology, CD-ROM, digital versatile disks (DVD) or other optical disk storage, magnetic cassettes, magnetic tape, magnetic disk storage or other magnetic storage devices, or any other manufactured data-storage device which can be used to store the desired information and which can accessed by computer 910.

The memory 930 may include computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, may be stored in ROM 931. RAM 932 may contain data and/or program modules that are immediately accessible to and/or presently being operated on by processing unit 920. By way of example, and not limitation, FIG. 9 illustrates an operating system 934, application programs 935, other program modules 936, and program data 937.

The computer 910 may also include other removable/non-removable, volatile/nonvolatile machine-readable media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile machine-readable media that can be used in the exemplary operating environment include, but are not limited to, magnetic tape cassettes, flash memory cards, digital versatile disks, digital video tape, solid state RAM, solid state ROM, and the like. The hard disk drive 941 may be connected to the system bus 921 through a non-removable memory interface such as interface 940, and magnetic disk drive 951 and optical disk drive 955 may be connected to the system bus 921 by a removable memory interface, such as interface 950.

The drives and their associated machine-readable media discussed above and illustrated in FIG. 9, provide storage of machine-readable instructions, data structures, program modules and other data for the computer 910. In FIG. 9, for example, hard disk drive 941 is illustrated as storing operating system 944, application programs 945, other program modules 946, and program data 947. These components may either be the same as, or different from, operating system 934, application programs 935, other program modules 936, and program data 937. Operating system 944, application programs 945, other program modules 946, and program data 947 are given different numbers here to illustrate that, at a minimum, they are different copies.

A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices may be connected to the processing unit 920 through a user input interface 960 that is coupled to the system bus, but may be connected by other interface and bus structures, such as a parallel port, game port or a universal serial bus (USB). A monitor 991 or other type of display device may also be connected to the system bus 921 via an interface, such as a video interface 990. In addition to the monitor, a computing device 910 may also include other peripheral output devices such as speakers 997 and printer 996, which may be connected through a output peripheral interface 995.

The computer 910 may operate in a networked environment using logical connections to one or more remote devices, such as a remote computer 980. The remote computer 980 may be a personal computer, a server, a router, a network PC, a peer device or other common network node, and may include many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments may be commonplace in offices, enterprise-wide computer networks, intranets and the Internet. Network connections may be wired, optical fiber based, or wireless.

When used in a LAN networking environment, the computer 910 may be connected to the LAN 971 through a network interface or adapter 970. The network interface may include a combination of software and hardware peripherals for connecting to a LAN or WAN. When used in a WAN networking environment, the computer 910 may include a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in a remote memory storage device. By way of example, and not limitation, FIG. 9 illustrates remote application programs 985 as residing on memory device 981. It will be appreciated that the network connections shown are exemplary and other means of establishing a communications link between the computers may be used.

V. Conclusion

Having thus described several aspects of at least one embodiment of a discussion-topic, networking system, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, and modifications, as will be appreciated by those of skill in the art.

While various inventive embodiments have been described and illustrated, those of ordinary skill in the art will readily envision a variety of other means and/or structures for performing the function and/or obtaining the results and/or one or more of the advantages described, and each of such variations and/or modifications is deemed to be within the scope of the inventive embodiments described. More generally, those skilled in the art will readily appreciate that all parameters, dimensions, materials, and configurations described are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many alternatives to the specific inventive embodiments described. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure may be directed to each individual feature, system, system upgrade, and/or method described. In addition, any combination of two or more such features, systems, and/or methods, if such features, systems, system upgrade, and/or methods are not mutually inconsistent, is included within the inventive scope of the present disclosure.

Further, though some advantages of the present invention may be indicated, it should be appreciated that not every embodiment of the invention will include every described advantage. Some embodiments may not implement any features described as advantageous. Accordingly, the foregoing description and drawings are by way of example only.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used are for organizational purposes only and are not to be construed as limiting the subject matter described in any way.

In connection with machine-implemented functionality, the above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers. The software, when executed, may specifically adapt the processor or collection of processors to perform the functionality according to one or more of the above described embodiments.

In this respect, various aspects of the invention, e.g., a discussion-topic server 140, a content share server 120a, a super data node 110a, may be embodied and/or implemented at least in part as machine-readable medium (e.g., a computer memory, one or more floppy discs, compact discs, optical discs, magnetic tapes, flash memories, circuit configurations in Field Programmable Gate Arrays (FPGAs) or other semiconductor devices, or other tangible computer storage medium or non-transitory medium) encoded with one or more programs that, when executed on one or more computers or other processor(s), perform acts of the one or more methods as described above. As is apparent from the foregoing examples, a computer readable storage medium may retain information for a sufficient time to provide computer-executable instructions in a non-transitory form. The machine-readable medium may be transportable, such that the program or programs stored thereon can be loaded onto one or more different computers or other processors to implement various aspects of the present technology as discussed above. In some embodiments, processing of data and aspects of system operation may be implemented entirely, or at least in part, in FPGAs as hard-wired machine-readable instructions.

Machine-readable instructions may be in any one or combination of several forms, such as program modules, executed by one or more computers or other devices. Generally, program modules may include routines, programs, objects, components, data structures, etc. that perform particular tasks or implement particular abstract data types. Typically the functionality of the program modules may be combined or distributed as desired in various embodiments.

Also, data structures may be stored in machine-readable media in any suitable form. For simplicity of illustration, data structures may be shown to have fields that are related through location in the data structure. Such relationships may likewise be achieved by assigning storage for the fields with locations in a machine-readable medium that conveys relationship between the fields. However, any suitable mechanism may be used to establish a relationship between information in fields of a data structure, including through the use of pointers, tags or other mechanisms that establish relationship between data elements.

Machine-readable instructions may be executable on one or more processors that employ any one of a variety of operating systems or platforms. Additionally, such instructions may be written using any of a number of suitable programming languages and/or programming or scripting tools, and also may be compiled as executable machine language code or intermediate code that is executed on a framework or virtual machine.

Data processors may be implemented as integrated circuits, with one or more processors in an integrated circuit component, including commercially-available integrated circuit components known in the art by names such as CPU chips, GPU chips, microprocessor, microcontroller, or co-processor. Alternatively, a data processor may be implemented in custom circuitry, such as an ASIC, or semicustom circuitry resulting from configuring a programmable logic device. As yet a further alternative, a processor may be a portion of a larger circuit or semiconductor device, whether commercially-available, semi-custom, or custom-built. As a specific example, some commercially-available microprocessors have multiple cores such that one or a subset of those cores may constitute a data processor suitable for implementing functionality described above. Though, a processor may be implemented using logic circuitry in any suitable format.

A data-processing device may be embodied in any of a number of forms, such as a rack-mounted computer, a desktop computer, a laptop computer, or a tablet computer. Additionally, a data-processing device may comprise embedded data-processing circuitry in a device not generally regarded as a computer but with suitable processing capabilities, including a Personal Digital Assistant (PDA), a smart phone, or any other suitable portable or fixed electronic device.

The terms "program" or "software" are used in a generic sense to refer to computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

The term "associated with," when used in connection with data structures, may be used to describe a combination of data structures in some embodiments. For example, first data associated with second data may mean adding the first data to a data record containing the second data, or vice versa. "Associated with" may mean establishing a relational data structure between first and second data in some embodiments. For example, first data may be entered in a table or augmented with an identifier that cross-references or links the first data to second data, even though the first and second data may be stored in different data stores.

The term "transmit," when used in connection with data structures, may be used to describe one or more acts of retrieving data, preparing the data in a format suitable for transmission, identifying at least one destination for the data, and providing the data to a data-transmission device. In some embodiments, "transmit" may mean one or more acts of preparing at least one action metadata message that identifies the data for transmission, identifying at least one destination for the message, and providing the action metadata message to a data-transmission device. The action metadata message may not include the data for transmission, but may prompt another device to request the data after receipt of the action metadata message.

Where user-interactive displays are described, active text or buttons may alter their appearance when selected or clicked on by a user. For example, active text or buttons may change color or be highlighted in any suitable manner when selected, so as to indicate that the text or button has been selected.

In some cases, functionality of the system may be described from the perspective of a user acting upon the system. For such descriptions, it will be understood that the system includes the necessary code and hardware that would provide a display for accepting user input, receive and process the input, and execute corresponding functionality responsive to the user input.

Also, the technology described may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used, should be understood to control over dictionary definitions, definitions in documents incorporated by reference, and/or ordinary meanings of the defined terms.

The terms "about," "approximately," and "substantially" may be used to refer to a value, and are intended to encompass the referenced value plus and minus variations that would be insubstantial. The amount of variation could be less than 5% in some embodiments, less than 10% in some embodiments, and yet less than 20% in some embodiments. In embodiments where an apparatus may function properly over a large range of values, e.g., one or more orders of magnitude, the amount of variation could be a factor of two. For example, if an apparatus functions properly for a value ranging from 20 to 350, "approximately 80" may encompass values between 40 and 160.

The indefinite articles "a" and "an," as used in the specification and in the claims, unless clearly indicated to the contrary, should be understood to mean "at least one."

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A discussion-topic server configured to manage communications and content sharing between a first device and at least one second device, wherein the discussion-topic server is configured to communicate over a data communications network with the first device and the at least one second device, the discussion-topic server comprising:
 at least one network interface connected to the data communications network and configured to receive and transmit data; and
 at least one processor adapted with machine-readable instructions that configure the discussion-topic server to:
  receive, from the first device, a conventional email chain message;
  receive, from the first device, naming data for identifying the conventional email chain message, wherein the naming data was entered by a user to name a discussion topic for the email chain message;
  create a discussion-topic data structure associated with the named discussion topic;
  parse email messages within the email chain as separate comment data;
  store the separate comment data in association with the discussion-topic data structure;
  identify at least one addressee in the email chain, in addition to the first device, as a respective participant in the named discussion topic that is permitted access to the discussion-topic data structure; and
  responsive to receiving a request from the respective participant for content associated with the discussion topic, transmit first visual feed data comprising the separate comment data to the respective participant for displaying on a display a discussion-topic page identified by the named discussion topic and comprising a listing of at least a portion of the separate comment data associated with the named discussion topic.

2. The discussion-topic server of claim 1, wherein the conventional email chain message is a first transmission received by the discussion-topic server for the named discussion topic.

3. The discussion-topic server of claim 1, wherein the at least one processor is further adapted to:
 provide an email inbox for the first device that is configured to receive conventional email transmissions for the first device; and
 receive the conventional email chain message in the email inbox.

4. The discussion-topic server of claim 1, wherein the at least one processor is further adapted to:
 determine originator identities for the separate comment data; and
 transmit with the visual feed data originator identities for displaying in the listing an originator identity in association with a corresponding separate comment data.

5. The discussion-topic server of claim 1, wherein the at least one processor is further adapted to:
 transmit dialog data to the first device responsive to receiving the conventional email chain message;
 receive, from the first device, the naming data following the transmission of the dialog data; and
 receive, from the first device, hierarchical data identifying the named discussion topic as a sub-topic or parent topic of another named discussion topic.

6. The discussion-topic server of claim 5, wherein the at least one processor is further adapted to enter in a relational data structure at least one entry identifying the named discussion topic as being related hierarchically as a sub-topic or parent topic to the other named discussion topic.

7. The discussion-topic server of claim 5, wherein the at least one processor is further adapted to:
 receive, from the first device, identifiers for at least one participant other than the at least one addressee that is or are to be invited to participate in the named discussion topic; and
 transmit at least one invitation to the at least one participant to join the discussion topic.

8. The discussion-topic server of claim 1, wherein the at least one processor is further adapted to:
 receive first comment data from a participant in the named discussion topic, wherein the first comment data is identified as associated with the named discussion topic;
 add the first comment data to the discussion-topic data structure; and
 transmit a conventional email message bearing an identifier for the discussion topic and including the first comment data to a conventional email account of a second participant in the named discussion topic.

9. The discussion-topic server of claim 8, wherein the at least one processor is further adapted to:
 receive a conventional email reply from the second participant;
 convert the conventional email reply to second comment data;
 store the second comment data in association with the named discussion topic; and
 forward the first and second comment data to the first device for adding to the listing.

10. The discussion-topic server of claim 1, wherein the at least one processor is further adapted to receive active tag data for the named discussion topic, wherein the active tag data is entered by a participant and comprises identifying data for identifying an active tag associated with the named discussion topic and argument data identifying an argument associated with the active tag.

11. The discussion-topic server of claim 10, wherein the argument comprises an identifier for a participant permitted access to the first discussion data structure.

12. The discussion-topic server of claim 10, wherein the argument comprises a date.

13. The discussion-topic server of claim 10, wherein the argument comprises an identifier for a second discussion topic.

14. The discussion-topic server of claim 10, wherein the argument comprises an alphanumeric string created by the user of the first device.

15. The discussion-topic server of claim 10, wherein the argument comprises a URL link.

16. A method for managing communications and content sharing between a first device and at least one second device, wherein the first device and the at least one second device are configured to communicate over a data communications network, the method comprising:
 receiving a conventional email chain message;
 receiving, at the first device, naming data entered by a user for identifying the conventional email chain message;

naming a discussion topic for the email chain message based on the naming data, wherein the conventional email chain message is a first transmission received for the named discussion topic;

creating a discussion-topic data structure associated with the named discussion topic;

displaying, on a display of the first device, a discussion-topic page identified by the named discussion topic; and displaying, on the discussion-topic page, a listing of comment data parsed from the conventional email chain message.

17. The method of claim 16, further comprising:

parsing email messages within the conventional email chain as separate comment data to be included in the listing;

storing the separate comment data in association with the discussion-topic data structure; and identifying at least one addressee in the email chain, in addition to the first device, as a participant in the named discussion topic that is permitted access to the discussion-topic data structure.

18. The method of claim 17, further comprising:

receiving identifiers entered by a user of the first device for at least one participant other than the at least one addressee that is or are to be invited to participate in the named discussion topic; and transmitting at least one invitation to the at least one participant to join the named discussion topic.

19. The method of claim 16, further comprising displaying on a display of the first device a discussion-topic page comprising a full-screen listing of at least a portion of the separate comment data in association with the named discussion topic.

20. The method of claim 19, further comprising:

receiving hierarchical data identifying the named discussion topic as a sub-topic or parent topic of another named discussion topic; and visually indicating on the display a hierarchical relationship between the named discussion topic and the other named discussion topic.

21. The method of claim 19, further comprising:

determining originator identities for the separate comment data; and displaying an originator identity in association with a corresponding separate comment data.

22. The method of claim 16, further comprising receiving active tag data for the named discussion topic, wherein the active tag data is entered by a participant and comprises identifying data for identifying an active tag associated with the named discussion topic and argument data identifying an argument associated with the active tag.

23. The method of claim 22, further comprising:

displaying, on the display of the first device, active button or active text identified as the active tag;

receiving an indication that the active button or active text has been selected; and performing, responsive to receiving the indication, a functional operation associated with the active tag.

24. The method of claim 23, wherein the argument associated with the active tag comprises a date and the functional operation comprises displaying a calendar for selecting a date.

25. The method of claim 23, wherein the argument associated with the active tag comprises a name of another discussion topic and the functional operation comprises changing the display to a discussion page for the other discussion topic.

* * * * *